US008898225B2

(12) United States Patent
Tasaka et al.

(10) Patent No.: US 8,898,225 B2
(45) Date of Patent: Nov. 25, 2014

(54) STORAGE MEDIUM STORING USER INFORMATION REGISTRATION PROGRAM AND USER INFORMATION REGISTRATION METHOD

(75) Inventors: Kazunobu Tasaka, Tokyo (JP); Kazuhiko Shimura, Hachioji (JP)

(73) Assignee: Olympus Imaging Corp. (JP)

( * ) Notice: Subject to any disclaimer, the term of this patent is extended or adjusted under 35 U.S.C. 154(b) by 321 days.

(21) Appl. No.: 13/487,340

(22) Filed: Jun. 4, 2012

(65) Prior Publication Data

US 2012/0239738 A1 Sep. 20, 2012

Related U.S. Application Data

(63) Continuation of application No. PCT/JP2010/072028, filed on Dec. 8, 2010.

(30) Foreign Application Priority Data

Dec. 10, 2009 (JP) .................................. 2009-280236

(51) Int. Cl.
*G06F 15/16* (2006.01)
*G06F 3/00* (2006.01)
*H04N 1/00* (2006.01)

(52) U.S. Cl.
CPC .... *H04N 1/00204* (2013.01); *H04N 2201/0084* (2013.01); *H04N 2201/0046* (2013.01)
USPC .................................. 709/203; 710/8; 710/10

(58) Field of Classification Search
USPC .......................................................... 709/203
See application file for complete search history.

(56) References Cited

U.S. PATENT DOCUMENTS

| 6,671,749 | B2 * | 12/2003 | Williams et al. ................. 710/10 |
| 2002/0095299 | A1 | 7/2002 | Iwakata |
| 2005/0038927 | A1 * | 2/2005 | Choi et al. ........................ 710/8 |
| 2007/0045415 | A1 * | 3/2007 | Usui ............................. 235/435 |

FOREIGN PATENT DOCUMENTS

| CN | 1921593 A | 2/2007 |
| JP | 2000123078 A | 4/2000 |
| JP | 3221487 | 8/2001 |
| JP | 2002-358409 | 12/2002 |
| JP | 2007-058701 | 3/2007 |
| WO | 2009057806 A1 | 5/2009 |

OTHER PUBLICATIONS

Office Action issued in corresponding Chinese Patent Application No. 201080055540 on Mar. 26, 2014, consisting of 11 pp.
International Search Report issued on Mar. 1, 2011 in counterpart International Patent Appln. No. PCT/JP2010/072028.

* cited by examiner

*Primary Examiner* — David Lazaro
*Assistant Examiner* — Mahran Abu Roumi
(74) *Attorney, Agent, or Firm* — Volpe and Koenig, P.C.

(57) ABSTRACT

An installer file, an application program file, and other such files are stored in image memory provided within a camera. Upon connection of the camera to a host device, programs within the installer file are read into the host device and automatically executed, and processing of user registration and installation processing of an attached application program contained within the application program file are automatically performed. After processing of program installation, the installer file and the application program file are deleted from the image memory.

26 Claims, 14 Drawing Sheets

STORAGE MEDIUM STORING USER INFORMATION REGISTRATION PROGRAM AND USER INFORMATION REGISTRATION METHOD

CROSS REFERENCE TO RELATED APPLICATIONS

This application is a continuation of International Patent Application No. PCT/JP2010/072028, filed on Dec. 8, 2010, which claims the benefit of Japanese Patent Application No. JP2009-280236, filed on Dec. 10, 2009, which are incorporated by reference as if fully set forth.

FIELD OF INVENTION

The invention relates to user information registration programs and user information registration methods, and in particular, it relates to techniques for user information registration by installing an application software to provide services for the users who have a certain terminal unit, by means of a computer connected to a network.

BACKGROUND

Conventionally, many of digital electronic devices, such as a digital camera, have been provided with application softwares for utilizing content dealt with by such digital product on a host device, such as a PC, by means of storage media such as a CD-ROM. In order to enable the application softwares, a great deal of operations are required from the user, including mounting those storage media on the host device, inputting some information with a keyboard according to the instructions from the installer activated, and selecting predetermined items from a list displayed.

On the other hand, recently, a variety of services are provided more frequently on the web for the users who have purchased products. In many cases, in order for the users to make use of such services, user registration is required for the products. Upon user registration, the users need to access a predetermined website with a computer, and input the user information or product information. Furthermore, upon user registration for an additionally-purchased product the product information or user information must be input again.

The fact that such information must be input upon installation of the above-described application softwares or user registration, which is an annoying task for an ordinary person, has been one of the reasons why many users do not install the application softwares or perform user registration. As a result, many of the users cannot receive valuable information related to the products, and many of them even have never utilized valuable services even if they are provided on the web.

To deal with the aforementioned problems, JP3221487B discloses a system in which an electronic device such as a personal computer preliminarily stores the individual product information. When the electronic device is activated for the first time, it automatically connects a host device (server) via a network and transfers, to the host device, the individual product information retrieved from the electronic device and personal information including the name, address, password, etc. input by the user to perform user registration.

SUMMARY

According to an aspect of the present invention, provided is a non-transitory computer-readable storage medium storing a user information registration program and used as a first memory of a terminal unit, the program being transferred to a host device to which the terminal unit is connected and executed on the host device, wherein the terminal unit inputs information and the first memory stores the input information, the program comprising first and second programs, wherein;

the first program is loaded and automatically activated on the host device when the terminal unit is connected to the host device, and the first program causes the host device to execute a step of determining whether the second program is already installed on the host device;

(a) if it is determined in the step of determining that the second program is not installed on the host device, the first program causes the host device to execute:

(a-1) a step of retrieving, from the terminal unit, device identification information that identifies the terminal unit, (a-2) a step of obtaining user information, the step at least performing either searching for user information through the host device, or displaying an input screen that promotes input of the user information and accepting input operation of the user information by the user, (a-3) a step of storing, in a second memory of the host device, the device identification information and the user information obtained by the step of obtaining user information, associating the device identification information and the user information to each other, (a-4) a step of transferring, to a server via a network, the device identification information and the user information obtained by the step of obtaining user information, and (a-5) a step of installing the second program on the host device, while (b) if it is determined by the step of determining that the second program is installed on the host device, the first program causes the host device to execute a step of activating the second program.

According to an aspect of the present invention, provided is a non-transitory computer-readable storage medium storing a user information registration program and used as a first memory of a terminal unit, the program being transferred to a host device to which the terminal unit is connected and executed on the host device, wherein the terminal unit inputs information and the first memory stores the input information, the program comprising first and second programs, wherein;

the first program is loaded and automatically activated on the host device when the terminal unit is connected to the host device, and the first program causes the host device to execute a step of determining whether the second program is already installed on the host device;

(a) if it is determined in the step of determining that the second program is not installed on the host device, the first program causes the host device to execute:

(a-1) a step of retrieving, from the terminal unit, device identification information that identifies the terminal unit, (a-2) a step of obtaining user information, the step at least performing either searching for user information through the host device, or displaying an input screen that promotes input of the user information and accepting input operation of the user information by the user, (a-3) a step of storing, in a second memory of the host device, the device identification information and the user information obtained by the step of obtaining user information, (a-4) a step of transferring, to a server via a network, the device identification information and the user information obtained by the step of obtaining user information, and (a-5) a step of installing the second program on the host device, while (b) if it is determined by the step of determining that the second program is installed on the host device, the first program causes the host device to execute a step of activating the second program, and the second program causes the host device to execute:

a second step of retrieving device identification information from the terminal unit, a step of retrieving user information stored in the second memory, a second step of transferring, to the server via the network, the device identification information retrieved by the second step of retrieving device identification information and the user information retrieved by the step of retrieving user information, and a second step of additionally storing, in the second memory, the device identification information retrieved by the second step of retrieving device identification information, by associating it with the user information.

According to an aspect of the present invention, provided is a user information registration method using a terminal unit including a first memory for storing input information, the first memory storing first and second programs, and a host device to which the terminal unit is connected, wherein the first program is an automatic execution program that is automatically transferred to the host device when the terminal unit is connected to the host device, and executed on the host device, and the method comprises;

retrieving the first program from the first memory and starting to execute the first program when the terminal unit is connected to the host device;

determining by means of the first program whether the second program is already installed on the host device, (a) if it is determined in the step of determining that the second program is not installed on the host device, by means of the first program;

(a-1) retrieving, from the terminal unit, device identification information that identifies the terminal unit, (a-2) obtaining user information, by at least performing either searching for user information through the host device, or displaying an input screen that promotes input of the user information and accepting input operation of the user information by the user, (a-3) associating the device identification information and the user information obtained by the obtaining of user information and storing the device identification information and the user information in a second memory of the host device, (a-4) transferring, to a server via a network, the device identification information and the user information obtained by the obtaining of user information, and (a-5) installing the second program on the host device; while (b) if it is determined by the determining that the second program is installed on the host device, activating the second program.

According to an aspect of the present invention, provided is a user information registration method using a terminal unit including a first memory for storing input information, the first memory storing first and second programs, and a host device to which the terminal unit is connected, wherein the first program is an automatic execution program that is automatically transferred to the host device when the terminal unit is connected to the host device, and executed on the host device, and the method comprises;

retrieving the first program from the first memory and starting to execute the first program when the terminal unit is connected to the host device;

determining by means of the first program whether the second program is already installed on the host device, (a) if it is determined in the step of determining that the second program is not installed on the host device, by means of the first program;

(a-1) retrieving, from the terminal unit, device identification information that identifies the terminal unit, (a-2) obtaining user information, by at least performing either searching for user information through the host device, or displaying an input screen that promotes input of the user information and accepting input operation of the user information by the user, (a-3) storing, in a second memory of the host device, the device identification information and the user information obtained by the obtaining of user information, (a-4) transferring, to a server via a network, the device identification information and the user information obtained by the obtaining of user information, and (a-5) installing the second program on the host device; while (b) if it is determined by the determining that the second program is installed on the host device, activating the second program, and by means of the second program;

(b-1) retrieving device identification information from the terminal unit, (b-2) retrieving user information stored in the second memory, (b-3) transferring, to the server via the network, the device identification information retrieved by the retrieving in (b-1) and the user information retrieved by the retrieving of the user information in (b-2), and additionally storing, in the second memory, the device identification information retrieved by the retrieving in (b-1), by associating it with the user information.

The details as well as other features and advantages of this invention are set forth in the remainder of the specification and are shown in the accompanying drawings.

DETAILED DESCRIPTION OF THE PREFERRED EMBODIMENTS

Figure 1:
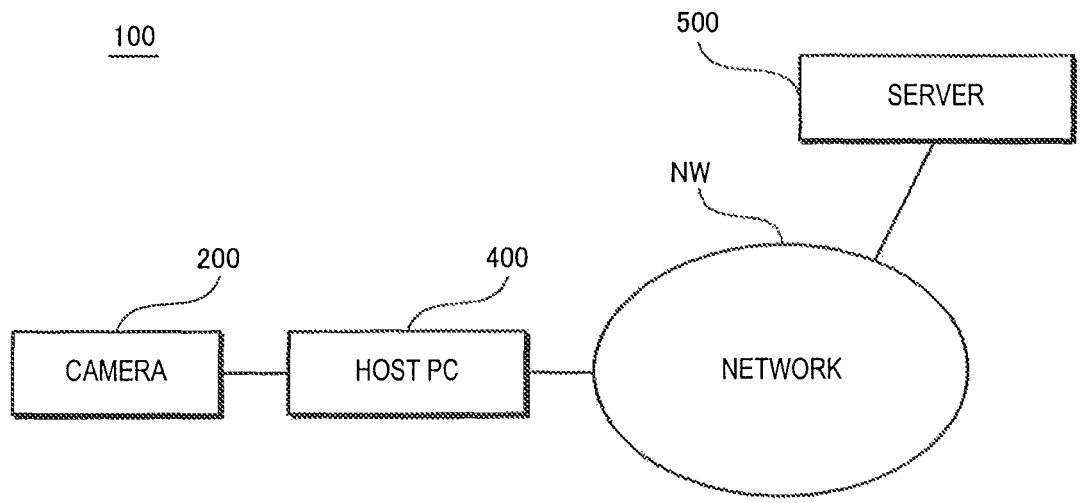
FIG. 1 is a block diagram illustrating connection of a camera as a terminal unit to a host PC connected to a server via network.

FIG. 1 is a schematic block diagram illustrating the configuration of a user information registration system 100 according to an embodiment of the present invention. The user information registration system 100 includes a camera 200 as a terminal unit, a host PC 400, and a server 500. The host PC 400 and the server 500 are connected via a network NW. As this network NW, Internet may be utilized, for example. The embodiment of the present invention refers to the camera 200 as an example of a terminal unit, however, the terminal unit may be a wide variety of devices including IC recorders, game consoles, PC peripherals, consumer electronics, electronic healthcare equipments, toys, electronic dictionaries, electronic book readers, data loggers, PDAs (personal digital assistances), PNDs (portable navigation devices), measuring devices, etc.

If the terminal unit is mobile that is carried by the user for its use, such as the camera 200, it is connected to the host PC 400 only when required. If the terminal unit is a stationary device, it may always be connected to the host PC 400 or may be connected only when required, by wire or wirelessly. The host PC 400 may be a so-called desktop PC or a portable PC. The host PC 400 is connected to the network NW by wire or wirelessly.

The server 500 is for registering the user of the camera 200. Although FIG. 1 illustrates only a server 500, the user information registration system 100 may include a plurality of servers.

Figure 2:
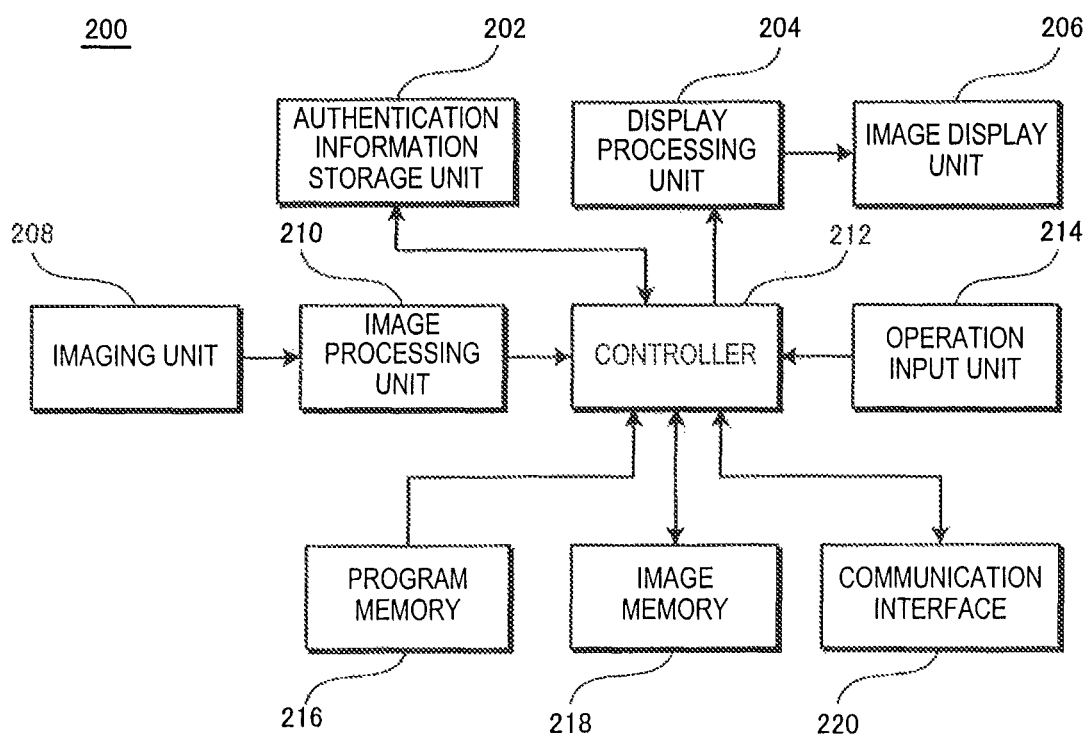
FIG. 2 is a schematic block diagram illustrating an example of the inner configuration of the camera.

FIG. 2 is a schematic block diagram illustrating the inner configuration of the camera 200. The camera 200 includes an authentication information storage unit 202, a display processing unit 204, an image display unit 206, an imaging unit 208, an image processing unit 210, a controller 212, an operation input unit 214, a program memory 216, an image memory 218, and a communication interface 220.

The authentication information storage unit 202, the display processing unit 204, the image processing unit 210, the operation input unit 214, the program memory 216, the image memory 218, and the communication interface 220 are electrically connected to the controller 212. The image display unit 206 is electrically connected to the display processing unit 204, and the imaging unit 208 is electrically connected to the image processing unit 210.

The authentication information storage unit 202 is configured to be able to store the device identification information and the user information. Preferably, the authentication information storage unit 202 comprises a non-volatile memory, such as a flash memory, EEPROM, or magnetic storage device, which is rewritable and does not need any electricity to retain the stored information. With the device identification information, the individual camera 200 can be uniquely identified. As an example of the device identification information, a combination of a code, which identifies the device model, and a serial number (manufacturer's number) can be used. The user information includes at least either of the user name or user's e-mail address.

At the initial state, i.e., at the factory default settings of the camera 200 (at that time of purchase thereof), the authentication information storage unit 202 only stores the device identification information. Then, the user information is additionally stored in the authentication information storage unit 202 by the user information registration described below.

The image memory 218 stores image data and the like captured by the camera 200 and may comprise a non-volatile storage device which can retain the stored information without supply of electricity, such as a flash memory or magnetic storage device. More specifically, the image memory 218 is a non-transitory computer-readable storage medium. The image memory 218 may be configured to be able to store, not only image data captured by the camera 200, but also those obtained by means of downloading, etc.

The authentication information storage unit 202 described above may be provided in the image memory 218. If, however, the image memory 218 is configured to be attachable to and detachable from the camera 200, such as a memory card, the authentication information storage unit 202 is preferably provided in a memory built in the camera 200. Hereinafter, the explanations will be made as the image memory 218 is built in the camera 200.

The imaging unit 208 includes an image pickup lens, an image pickup device for generating image signals by photoelectric conversion of the image captured by the image pickup lens, and an analog front-end unit for retrieving analog image signals from the image pickup device, and amplifying and converting them to digital image signals.

The image processing unit 210 processes digital image signals output from the imaging unit 208 and generates image data. This image data is stored in the image memory 218. The image processing unit 210 is also configured to be able to sequentially process digital image signals that are retrieved from the imaging unit 208 in relatively short cycles, and to generate live view images.

The operation input unit 214 includes a power switch, a shooting/playback mode switch, a release switch, etc. The operation input unit 214 also includes a push switch, slide switch, touch panel, dial switch, etc. for switching the focal length, white balance, exposure mode, moving/still image storage mode, etc.

In response to the user's operation of the operation input unit 214, the controller 212 controls components such as an actuator, display element, and sensor of the camera 200, in a comprehensive manner, such that the camera 200 operates with the mode of the user's demand. The controller 212 may comprise a CPU or hardware logic, etc. If the controller 212 comprises a CPU, programs to be executed in the controller 212 are stored in the program memory 216. The program memory 216 may be configured to include a flash memory and a RAM. In the following explanation, the controller 212 is a CPU that can interpret and execute the programs stored in the program memory 216.

The controller 212 also performs storage management of the image data generated by the image processing unit 210, upon its storage in the image memory 218. The controller 212 also controls the operation to retrieve the image data stored in the image memory 218 and display the same on the image display unit 206 described below. The controller 212 further controls the operation to display live view images on the image display unit 206, if the live view image data is output from the image processing unit 210 when the user points the camera 200 at the object and sets the composition or exposure condition.

The image display unit 206 is configured to be able to display images, icons, characters, etc. and is comprised of a backlit TFT color liquid crystal panel, an organic EL color display panel, or the like. The display processing unit 204 controls the image display unit 206 based on image data output from the controller 212 for displaying, and displays the image.

Figure 3:
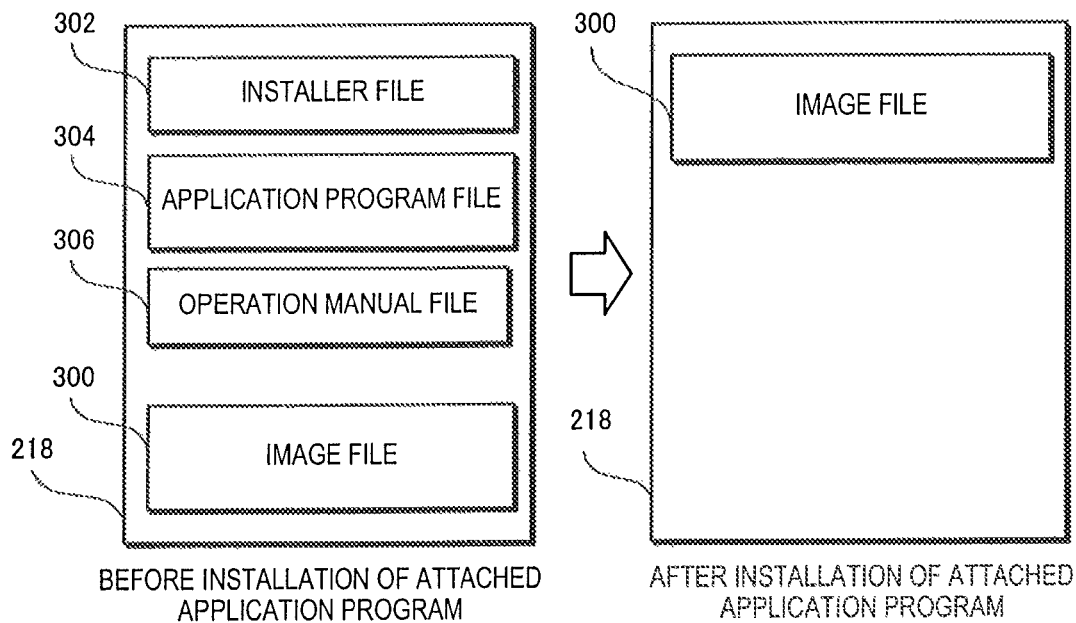
FIG. 3 is a schematic block diagram illustrating an example of the configuration of files stored in an image memory built in the camera.

FIG. 3 is a schematic diagram illustrating an example of files stored in the image memory 218 before and after the program installation described below. At the time of purchase of the camera, stored in the image memory 218 are files including an installer file 302, an application program file 304, an operation manual file 306, etc. The installer file 302 and the application program file 304 store programs to be executed on the host PC 400. The operation manual file 306 stores, in an electronic form, a manual describing how to operate the camera 200 or application programs. The format of the operation manual file 306 is of a format accessible on the host PC 400. If the user shoots a photo right after the purchase of the camera 200, an image file 300 is stored in the image memory 218.

When the camera 200 is connected to the host PC 400, the installer file 302 is automatically loaded and activated on the host PC 400. That is to say, it is automatically executed. Upon execution of the automatic execution program in the installer file 302, registration process of the user information or transferring and installing process of the application program file 304 on the host PC 400, described below, is performed. Then, the installer file 302 and the application program file 304 are deleted from the image memory 218.

The installer file 302 may be something like Autoexec.bat for MS-DOS, for example. More specifically, when a terminal unit such as the camera 200 is connected to the host PC 400, the operating system (OS) of the host PC 400 searches for files stored in the terminal unit. The OS of the host PC 400 can be configured to, if there is a file of automatic execution type among the searched files, automatically load and execute the file.

The operation manual file 306 may be configured to be transferred to the host PC 400 by the automatic execution program in the installer file 302 upon the activation of the automatic execution program, and then deleted from the image memory 218. Alternatively, the operation manual file 306 may be configured to be transferred to the host PC 400 by the application program in the application program file 304, upon the first activation of the application program after installation thereof on the host PC 400, and then deleted from the image memory 218.

As described above, the installer file 302, the application program file 304 and the operation manual file 306 are deleted from the image memory 218 during the program installation, and the image file 300 is left. As a result, the image memory 218 can be effectively utilized as a space to store the image file 300.

Note that if it is needed to replace the host PC with a new one after the program installation process described above, the replacement may be carried out as follows, for example. That is to say, it is possible that a menu to format the image memory 218 may be selected in an application program executed on the host PC 400. When the menu is selected, the installer file 302, the application program file 304 and the operation manual file 306 stored in the host PC 400 will be stored in the formatted image memory 218.

Alternatively, a storage medium such as an optical disk that stores a program for the process to format the image memory 218 may be equipped with the camera 200. In this case, as a result of the execution of the program in the storage medium by the user on the host PC 400, the image memory 218 of the camera 200 connected to the host PC 400 is formatted, and the installer file 302, the application program file 304 and the operation manual file 306 stored in the storage medium will be copied into the image memory 218. After the completion of this process, the camera 200 is connected to a new host PC, and thereby the program installation described above will be performed.

Figure 4:
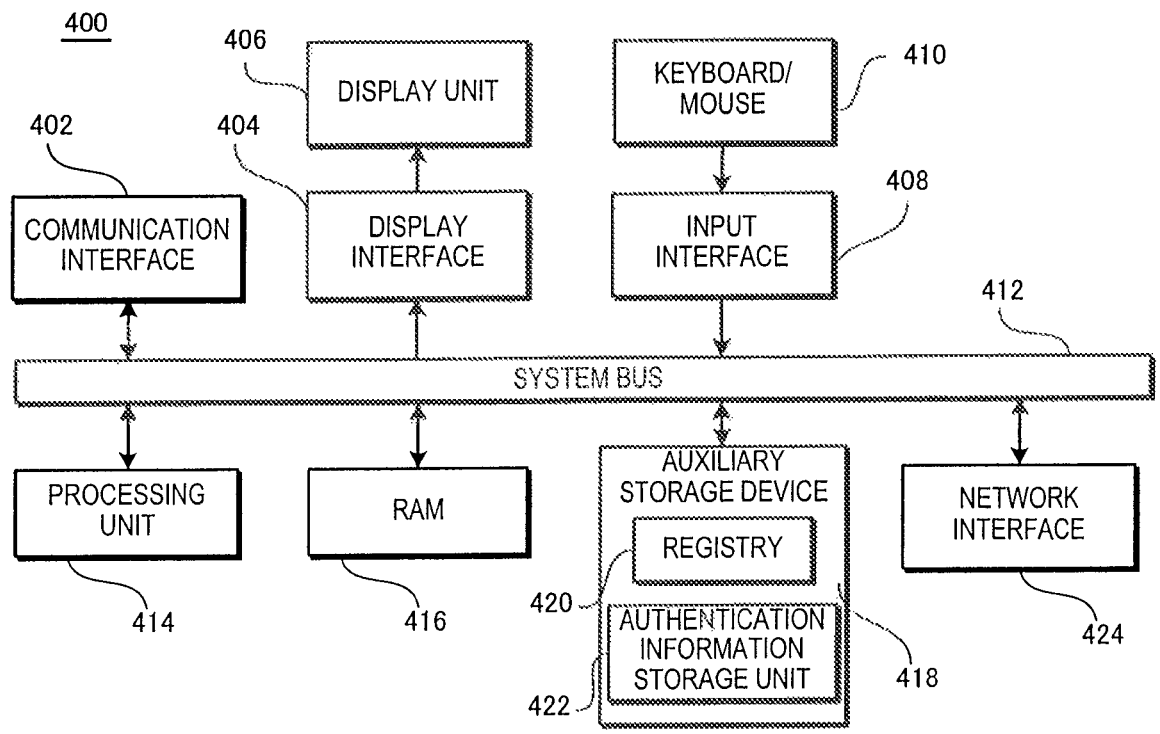
FIG. 4 is a schematic block diagram illustrating an example of the inner configuration of the host PC.

FIG. 4 is a schematic block diagram illustrating the configuration of the host PC 400. The host PC 400 includes a communication interface 402, a display interface 404, a display unit 406, an input interface 408, an input device 410 such as a keyboard or mouse, a processing unit 414, a RAM 416, an auxiliary storage device 418, and a network interface 424. Among those components, the communication interface 402, the display interface 404, the input interface 408, the processing unit 414, the RAM 416, the auxiliary storage device 418, and the network interface 424 are electrically connected to each other via a system bus 412.

The communication interface 402 is to enable intercommunication with a terminal unit such as the camera 200, by wire or wirelessly, to transfer and receive information. The display unit 406 comprises a CRT, flat-panel display, or the like. The display interface 404 controls the display unit 406 to display images, icons, characters, etc. on the display unit 406.

The input device 410 is a user interface for the user to input desired information into the host PC 400 and operate it. Users' operations of the input device 410 are transferred to the processing unit 414 via the input interface 408.

The processing unit 414 comprises a CPU, etc. and is configured to be able to process information in various manners. The RAM 416 is used as a work area for the processing unit 414 to process information. The auxiliary storage device 418 is a storage device of a relatively large storage capacity, which comprises a hard drive, a solid state drive, or the like.

The auxiliary storage device 418 is provided with an area where the set-up data for the system or application softwares, etc. is managed and stored by the OS, and an area where the authentication information is stored. The set-up data for the system or application softwares, etc. that is managed by the OS is referred to as "registry" in Windows. Hereinafter, the set-up data, etc. described above is referred to as "registry information" as the host PC 400 is managed by a Windows OS. Also, the area to store the registry information is referred to as a registry 420, and the area to store the authentication information is referred to as an authentication information storage unit 422. In the authentication information storage unit 422, the device identification information input from the camera 200 via the communication interface 402 is stored, being associated with the user information. The network interface 424 is to transfer and receive information to and from another device via a network.

Figure 5A:
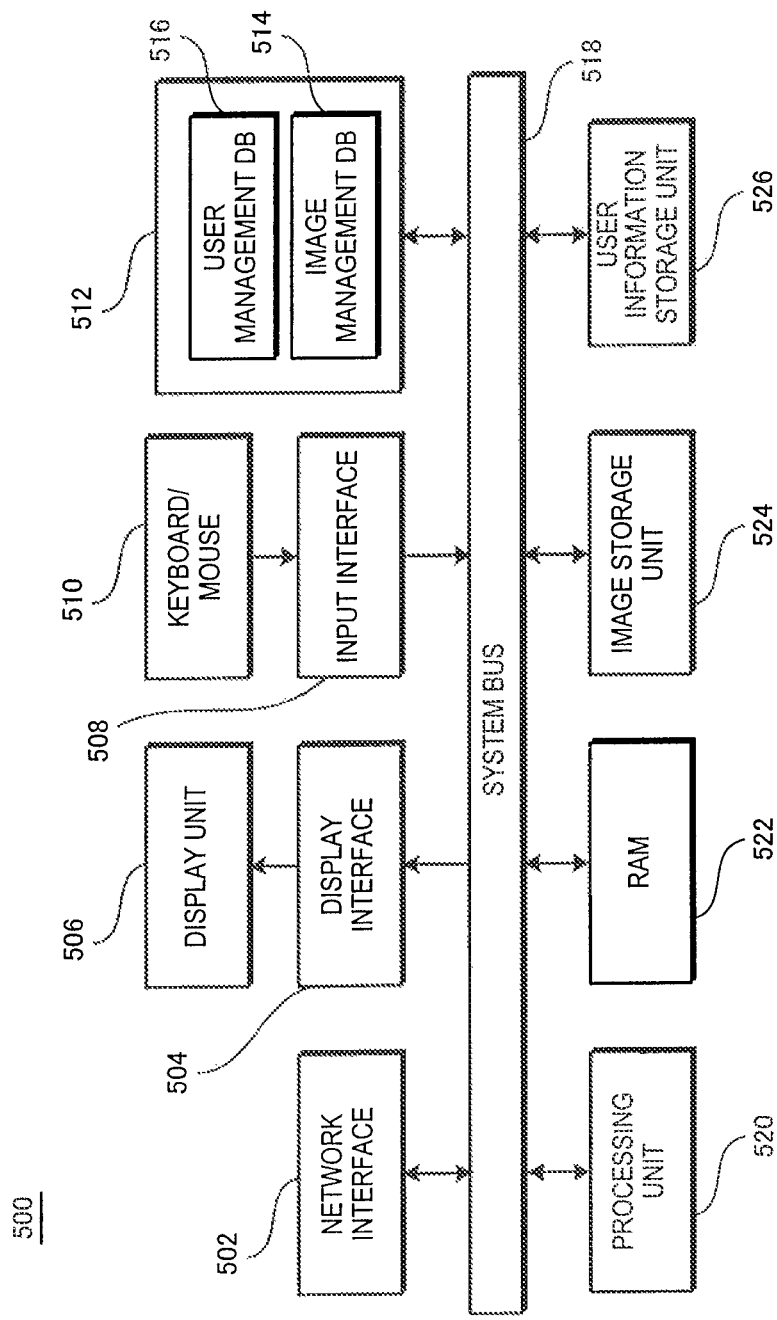
FIG. 5A is a schematic block diagram illustrating an example of the inner configuration of the server.

FIG. 5A is a schematic block diagram illustrating the configuration of the server 500. The server 500 is configured to be able to provide users, etc. of the camera 200 with various services via a network. As an example, the server 500 is configured to be able to provide users of the camera 200 with an online album service, print order service, etc. The online album service provides users of the camera 200 with a predetermined size of image data memory space to store images (image data) transferred to the server 500 through the Internet. And the service allows the users themselves, those given by the users the URL information and password, and the general public to view images. The print order service receives orders of printing of images, creation of albums, etc. through the Internet, and posts the ordered items to the addresses designated by the users.

The server 500 includes a network interface 502, a display interface 504, a display unit 506, an input interface 508, an input device 510 such as a keyboard or mouse, an auxiliary storage device 512, a processing unit 520, a RAM 522, an image storage unit 524, and a user information storage unit 526. Among those components, the network interface 502, the display interface 504, the input interface 508, the auxiliary storage device 512, the processing unit 520, the RAM 522, the image storage unit 524, and the user information storage unit 526 are electrically connected to each other via a system bus 518.

The network interface 502 transfers and receives information to and from the host PC 400 via a network. The display unit 506 comprises a CRT, flat-panel display, or the like. The display interface 504 controls the display unit 506 to display images, icons, characters, etc. on the display unit 506.

The input device 510 is a user interface for the administrator to input desired information into the server 500 and operate it. Administrators' operations of the input device 510 are transferred to the processing unit 520 via the input interface 508.

The processing unit 520 comprises a CPU, etc. and is configured to be able to process information in various manners. The RAM 522 is used as a work area for the processing unit 520 to process information. The auxiliary storage device 512 is a storage device of a relatively large storage capacity, which comprises a hard drive, or the like. In the auxiliary storage device 512, an image management database 514 and a user management database 516 are created. The image storage unit 524 and the user information storage unit 526 may be a storage device similar to the auxiliary storage device 512.

In the image storage unit 524, image data uploaded by the user of the camera 200 is stored. In the user information storage unit 526, device identification information, user information such as the user name or e-mail address, etc. are stored corresponding to each individual user who has completed the user registration (hereinafter, referred to as "registered user"). The user information may further include information on the language setting or time zone setting of the host PC 400, and information on the login name or password required for the user to access a website to make use of the above-described online album service or print order service. The user information storage unit 526 may also be configured to be able to store, as the transaction history, date and time of the user's access to the website, operations performed thereon, order details if printing was ordered, shipment record, record on payment received/outstanding, etc.

The user management database 516 is for storing where in the user information storage unit 526 information, such as the device identification information, user information, account information, and transaction history, is stored corresponding to each registered user. The image management database 514 is for storing where in the image storage unit 524 image data uploaded by the registered users is stored corresponding to each registered user.

Figure 5B:
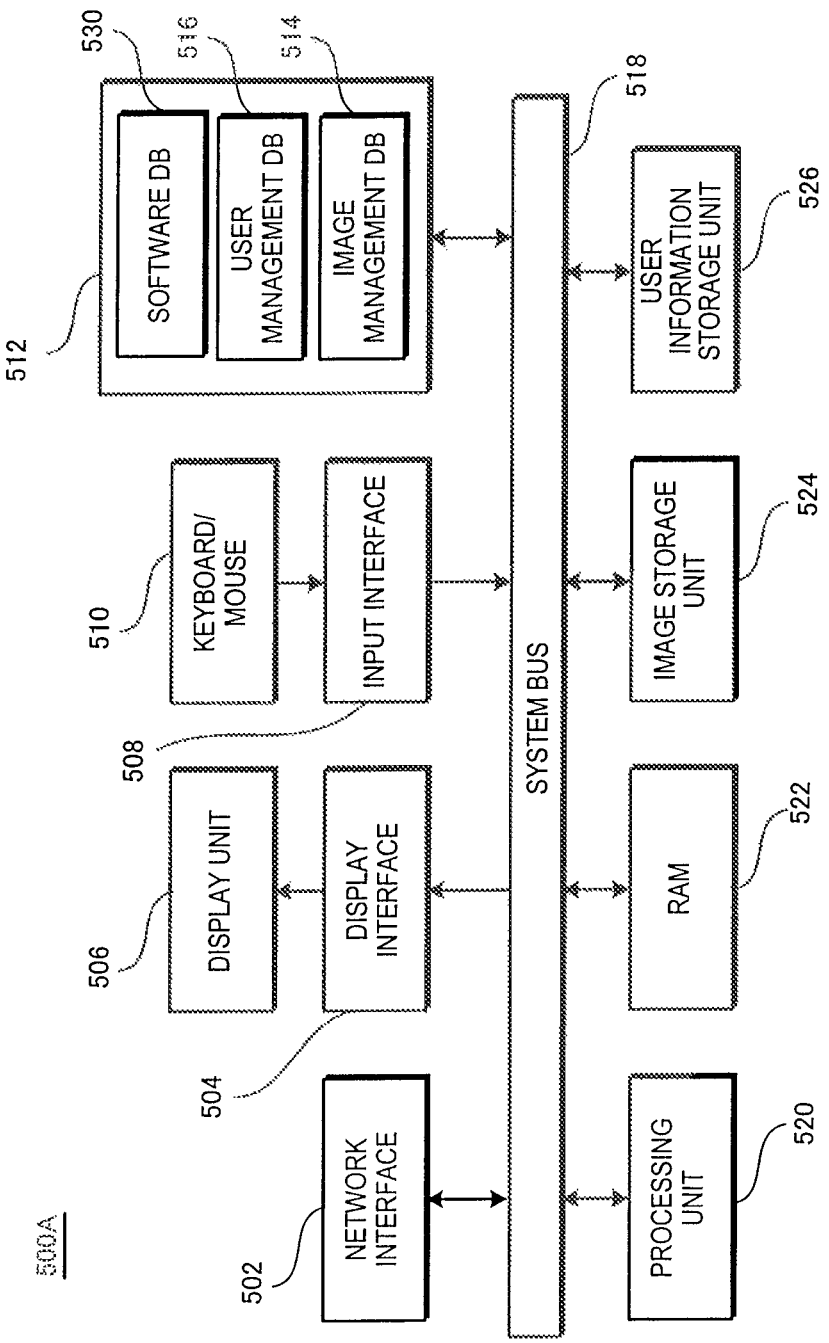
FIG. 5B is a schematic block diagram illustrating of another example of the inner configuration of the server.

FIG. 5B is a block diagram illustrating an configuration different from that of the server 500 shown in FIG. 5A. In the server 500A shown in FIG. 5B, components similar to those of the server 500 shown in FIG. 5A are denoted by the same numerals as those of FIG. 5A, and explanations thereof are omitted.

The difference between the server 500A and the server 500 is that in the server 500A, a software database 530 is created in the auxiliary storage device 512. Now, explanations will be made on the software database 530. As a large number of the cameras 200 are purchased, there are a large number of users thereof. Therefore, there are a large number of the host PCs 400 corresponding to the number of users. Those plural host PCs 400 have a variety of specifications, a variety of OSes are installed thereto, and a variety of application softwares such as a word processor, spreadsheet software, e-mail software, graphics processing software, web-browser software, etc. are installed.

In order for each user to log onto the respective host PCs 400, a login username is registered to each respective host PC 400. The login username is managed by the OS installed on each host PC 400. For example, in the case of a Windows OS, the login username is included in information in a registry file. In the case of a non-Windows OS, the login username is also found by accessing information similar to a registry. The software database 530 stores, in the form of a database, types or versions of OSes that general users may use, and corresponding to the types or versions, the name of the file including information on the login username described above, information on the storage directory of such file, etc.

As described above, each individual user installs a variety of application softwares on their respective host PC 400 in accordance with the intended use. Those application softwares include a software, such as an e-mail software, for managing information on user's e-mail addresses. Among application softwares that have been universally used, the software database 530 also stores, in the form of a database, the names of the softwares that may include information on user's e-mail address, the names of files managed by such softwares and including information on user's e-mail address, and information on the storage directory of such files.

OSes and application softwares are updated or newly released in a relatively short period of time. Corresponding to that, the software database 530 described above is updated by the administrator of the server 500A, as required.

Now, explanations will be made on the procedure of user information registration performed by means of the configurations described above.

First Embodiment

In the first embodiment of the present invention, explanations will be made on an example where the server connected to the host PC 400 via the network NW is the server 500 shown in FIG. 5A. More specifically, explanations will be made on an example where the server 500 that does not have the software database 530, which on the other hand is included in the server 500A as described above with reference to FIG. 5B.

Figure 6:
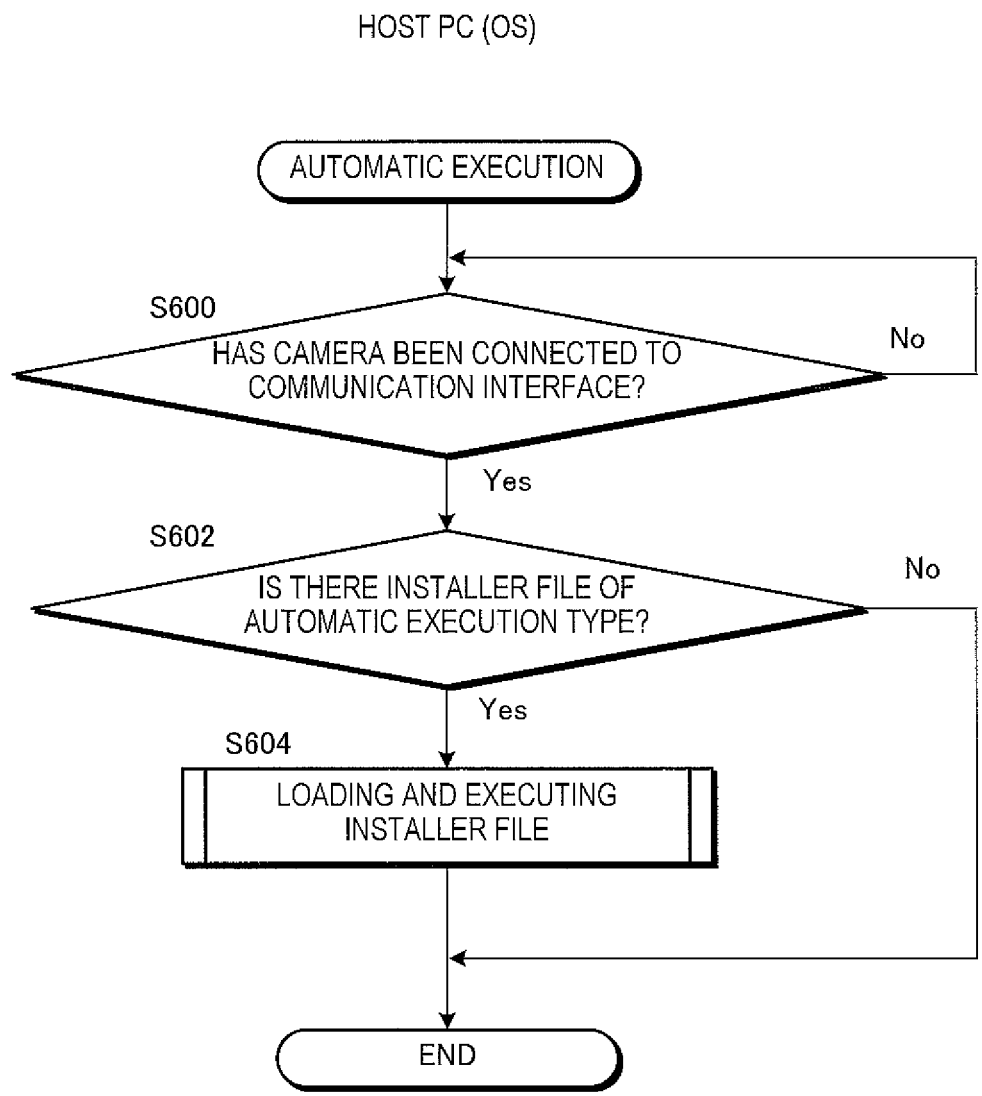
FIG. 6 is a flowchart describing a procedure of detecting connection of the camera to the host PC by the OS of the host PC, and if there is any installer file of automatic execution type in the image memory of the camera, loading and executing it.

FIG. 6 is a schematic flowchart describing the procedure executed by the processing unit 414 of the host PC 400. It is understood that the procedure shown in FIG. 6 is incorporated in the OS. In S600, the processing unit 414 determines whether a terminal unit such as the camera 200 is connected to the communication interface 402. As long as it is determined as No in this determination, the process of S600 is repeated at a time interval.

If it is determined as Yes in S600, the process proceeds to S602. Then, the processing unit 414 determines whether there is any program file of automatic execution type in the image memory 218 of the camera 200. In this embodiment, the installer file 302 shown in FIG. 3 is such a program file of automatic execution type. The program file of automatic execution type is of a file name and a file format that enable the OS to recognize that the file is of automatic execution type.

If it is determined as No in S602, the series of processes shown in FIG. 6 ends. On the other hand, if it is determined as Yes in S602, the process proceeds to S604, wherein the processing unit 414 loads the program file of automatic execution type from the image memory 218 of the camera 200 into the RAM 416 in the host PC 400, and executes the same. When the process of S604 ends, the series of processes shown in FIG. 6 finishes.

In the above explanation, the process of S600 is repeated at a time interval. As another example, an interrupt signal may be generated when the camera 200 is connected to the host PC 400 via a communication interface, and the processes of S602 and S604 may be executed in response to generation of the interrupt signal.

Figure 7A:
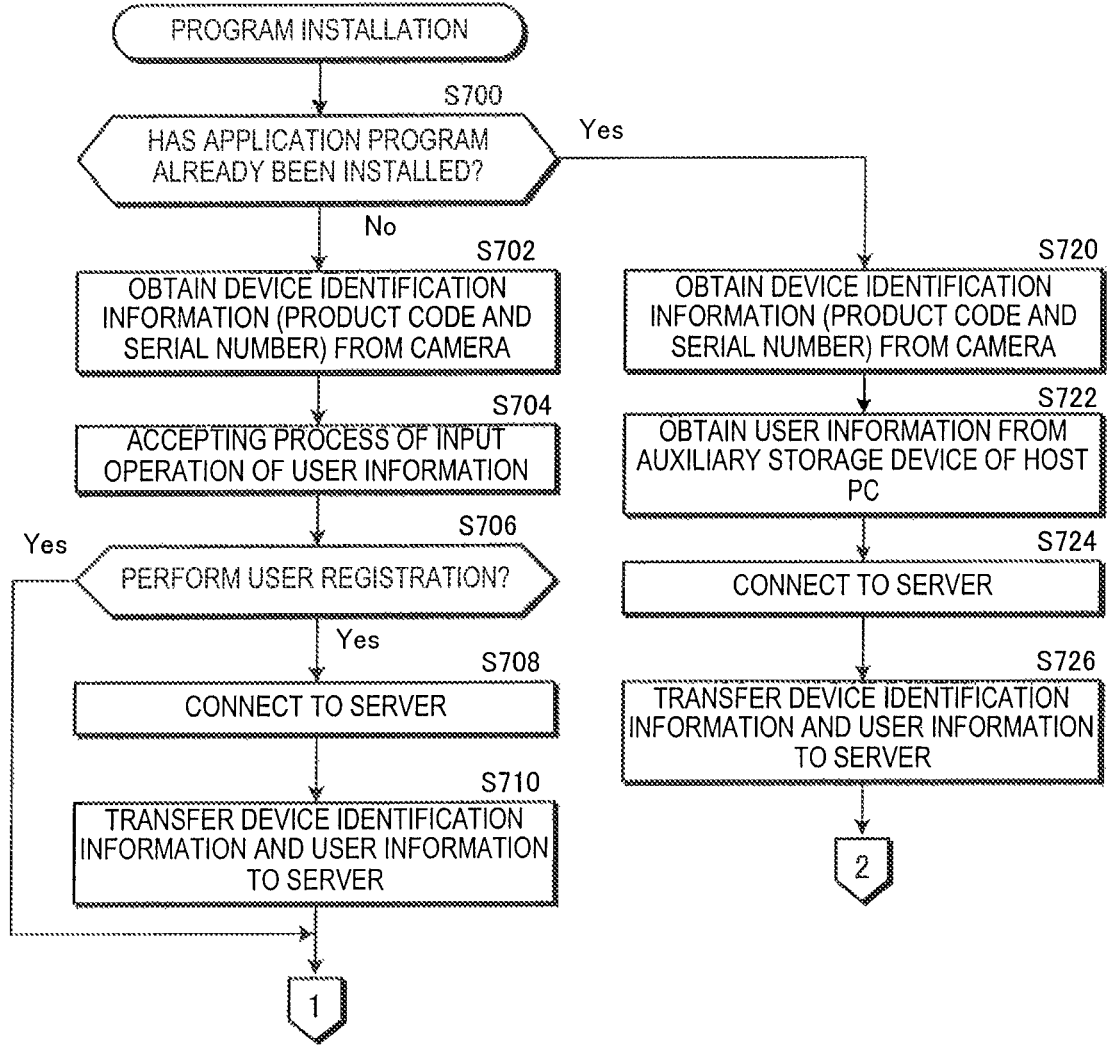
FIG. 7A is a flowchart describing a first embodiment of the present invention, wherein an install program in the image memory of the camera is executed on the host PC, as a result of execution of the procedure shown in the flowchart of FIG. 6.
Figure 7B:
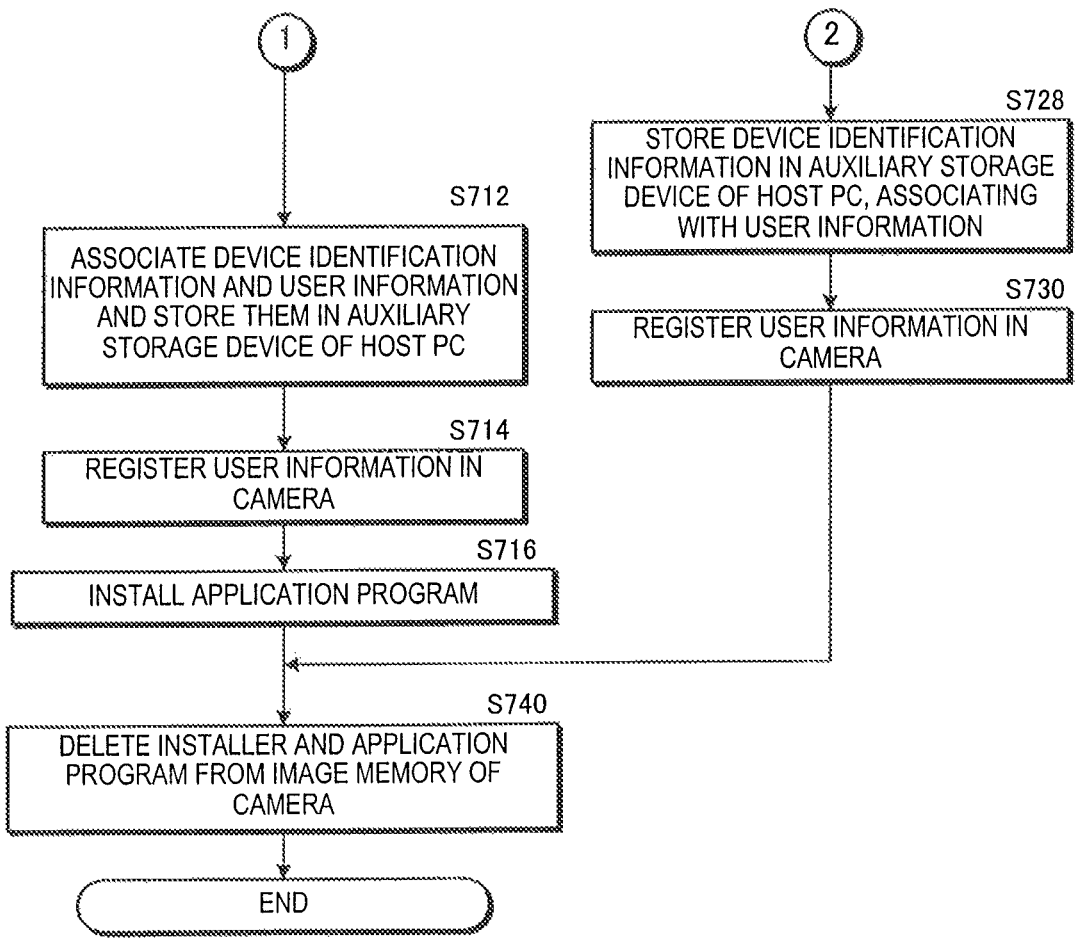
FIG. 7B is a flowchart following that of FIG. 7A.

FIGS. 7A and 7B are schematic flowcharts illustrating the procedures wherein, as a result of execution of the procedure of FIG. 6, the processing unit 414 of the host PC 400 load a program stored in the installer file 302 into the RAM 416 and automatically executes the program.

In S700, the processing unit 414 determines whether the application program is already installed on the host PC 400. Here, the application program means a program that is provided by the supplier of the camera 200 to the camera 200. The program may, for example, allow for sharing of photographs by accessing to an online album website and uploading image data, or by downloading image data obtained by others. Alternatively, the program may allow for ordering of printing or photo books by accessing a photo print order website and uploading image data.

It should be understood that those are mere examples and, according to the functions of the terminal unit etc., the application programs may be for functions of various types. Hereinafter, to distinguish them from application softwares such as a word processor, spreadsheet software, etc., the application program stored in the application program file 304 is referred to as "attached application program".

If it is determined as Yes in S700, it means that user registration or installation process of the attached application program, described below, has already been performed on the host PC 400. More specifically, this considers a flow of processes taken when the user additionally purchases (or replaces the original camera by purchasing) a new camera 200 and connects it to the host PC 400 for the first time. On the other hand, the processes taken when it is determined as No in S700 are such that consideration is given for the case where user registration or installation of the attached application program, described below, has not been performed on the host PC 400 yet.

In S702 that is taken when it is determined as No in S700, the processing unit 414 retrieves the device identification information preliminarily stored in the authentication information storage unit 202 of the camera 200. Preferably, with the device identification information, each individual product can be uniquely identified. For example, the device identification information may be a combination of a product code and a serial number. Alternatively, with a technique such as IPv6 and the like, if a unique IP address is assigned to each individual product, such information may be the device identification information.

In S704, the processing unit 414 displays a user information input screen on the display unit 406. More specifically, it displays an input screen that promotes input of the user information including the user name, e-mail address, etc. Then, the processing unit 414 accepts input operation of user information by the user.

In S706, the processing unit 414 displays, to the user, a query as to whether the user performs the user registration, and then accepts a "Yes" or "No" operation, and determines whether it should allow for the user registration.

If it is determined as Yes in S706, the processing unit 414 performs server connection process in S708. The server connection process is a process in which it connects a server 500 (FIG. 1) via the network NW. In this embodiment, the server 500 is for performing user information registration.

In S710, the processing unit 414 transfers the device identification information and user information to the server 500. The server 500 stores the device identification information and the user information transferred from the host PC 400 in the user information storage unit 526, and resisters the device identification information and the user information in the user management database 516, associating them with each other. As a result, user registration of the user of the camera 200 is completed. At that time, the server 500 may issue a password, etc. In that case, the processing unit 414 receives information on such password.

After the process of S710, or if it is determined as No in S706, the process of S712 is then performed. In S712, the processing unit 414 stores the device identification information and user information in the authentication information storage unit 422, associating them with each other.

In S714, the processing unit 414 registers the user information in the authentication information storage unit 202 of the camera 200. At that time, the processing unit 414 retrieves the setting information of the host PC 400 such as the language setting, time setting, time zone, etc., and based on the setting information, the language setting (the setting of the language by which the menu, etc. should be displayed), time setting, time zone setting, etc. of the camera 200 may be set. With this, the time setting, language setting, time zone setting, etc., which are usually performed by the user of the camera 200 when the user operates the camera 200 for the first time after the purchase thereof, can be automated.

If a password is issued by the server 500 in response to the process of S710, the following may be performed. That is to say, the processing unit 414 can store, in S712, the device identification information, the user information and the password in the authentication information storage unit 422, associating them with each other. Moreover, in S714, the user information and the password can be registered in the authentication information storage unit 202.

In S716, the processing unit 414 performs a process for installing the attached application program. More specifically, the processing unit 414 performs a process for retrieving the application program file 304 from the image memory 218 of the camera 200, and installing the attached application program on the host PC 400. At that time, if necessary, the operation manual file 306 may be copied into the auxiliary storage device 418 of the host PC 400.

The process of S720 that is taken if it is determined as Yes in S700 and the following processes are as described above. More specifically, they are such that consideration is given for the case where the user has already completed user registration and installation of the attached application programs after the purchase of the first camera 200, and now, additionally purchased a new camera 200 and connected it to the host PC 400 for the first time.

In S720, the processing unit 414 retrieves the device identification information from the authentication information storage unit 202 of the additionally-purchased camera 200. In S722, the processing unit 414 retrieves the user information from the auxiliary storage device 418 of the host PC 400. More specifically, when the originally-purchased camera 200 is connected to the host PC 400 for the first time, the user information was already stored in the authentication information storage unit 422 in the process of S712, and therefore, in S722, this user information is retrieved from the authentication information storage unit 422.

The processes of S724, S726, S728, and S730 are similar to those of S708, S710, S712, and S714. As a result of the process of S726, the device identification information and the user information corresponding to the additionally-purchased camera 200 are transferred to the server 500. In the server 500, the device identification information corresponding to the additionally-purchased camera 200 is additionally stored in the user information storage unit 526, and the registered content of the user management database 516 is also updated. In S728, the device identification information corresponding to the additionally-purchased camera 200 is additionally stored in the authentication information storage unit 422 of the host PC 400.

Then, in S730, the user information is registered in the authentication information storage unit 202 of the additionally-purchased camera 200. At that time, as described with respect to the process of S714, the setting information of the host PC 400 such as the language setting, time setting, time zone, etc. may be retrieved, and based on the setting information, the language setting, time setting, time zone setting, etc. of the camera 200 can be set. Moreover, if necessary, the operation manual file 306 stored in the image memory 218 of the camera 200 can be copied into the auxiliary storage device 418 of the host PC 400.

Note that a process similar to S706 may be performed between the processes of S722 and S724 in order to let the user determine whether the user performs the user registration for the additionally-purchased camera 200. Then, if the user does not want to perform the user registration for the additionally-purchased camera 200, the processes of S724 and S726 may be skipped to execute the process of S728 and the following processes.

After the process of S716 or S730, the process of S740 is performed. In S740, the processing unit 414 deletes the installer file 302 and the application program file 304 stored in the image memory 218 of the camera 200. Moreover, the operation manual file 306 may also be deleted. At that time, preferably, the processing unit 414 keeps backup files for the files 302 and 304, and if necessary for the operation manual file 306 too, in predetermined folders in the auxiliary storage device 418. This is because when replacing the host PC 400 with a new one and installing the attached application program on the new host PC 400, these files 302, 304 and 306 are required.

If the camera 200 is equipped with a storage medium such as a CD-ROM and the files 302, 304, 306 are stored therein, the backup process as described above is not necessarily needed. Alternatively, if the files 302, 304, 306 can be downloaded from a predetermined server via a network, the backup process as described above is not necessarily needed.

In the above explanations with reference to the flowchart of FIG. 7, explanations of the example has been made where the installer file 302 and the application program file 304, and the operation manual file 306 if necessary, are deleted all at once from the image memory 218 of the camera 200 in S740. However, the processes to delete these files 302, 304, 306 may be performed separately. More specifically, at the time when any of the files 302, 304, 306 is loaded from the image memory 218 into the host PC 400, the file becomes deletable from the image memory 218. Thus, the respective files 302, 304, 306 may be deleted at the time when they become deletable, respectively, or at a later time.

If it is determined by the determination process of S700 that the attached application program has already been installed on the host PC 400, the installation of the attached application program in S716 is not performed. Thus, the redundant installation of the same attached application program or any problem arising therefrom can be limited.

Alternatively, a process of checking the version of the application program file 304 stored in the image memory 218 of the additionally-purchased camera 200 can be added during, before or after the processes of S720 to S730. In this case, if the program versions are different, the normal update or the differential update may be performed, and if there is no difference, the normal update or the differential update may be skipped.

With respect to the attached application program installed on the host PC 400, it may be checked whether there is a program of new version when the host PC 400 is connected to a server via the network NW, and if there is any, the attached application program may be updated as required.

In the above explanations, explanations of the example has been made where the installer file 302 and the application program file 304 stored in the image memory 218 of the camera 200 are deleted at once in S740. However, the files 302, 304 do not necessarily have to be deleted at once, and they may be deleted separately. More specifically, the installer file 302 can be deleted before or after an arbitrary process of FIG. 7. The application program file 304 can be deleted after the process of S740, or if it is determined as Yes in S700, at a given timing thereafter.

As described above, according to the first embodiment of the present invention, the processes explained with reference to FIG. 7 are automatically executed when the user connects the camera 200 to the host PC 400 for the first time after the purchase. Then, at the time of the user registration, the device identification information is retrieved from the camera 200, and therefore, what the user needs to input is only the user information. Then, if the user decided to perform the user registration based on the device identification information automatically retrieved and the user information inputted by the user, the user registration will be completed when the user clicks a button saying "Proceed with user registration".

Then, when the user additionally purchases a camera 200 and connects it to the host PC 400 for the first time, the processes explained with reference to FIG. 7 are also automatically executed. At that time, as described above, the user information has already been stored in the authentication information storage unit 422 of the host PC 400, when the originally-purchased camera 200 was connected to the host PC 400 for the first time. Thus, at the time of the user registration for the additionally-purchased camera 200, there is no need for the user to input the user information.

The automatic execution program (the program that executes the program installation process of FIG. 7) described above is activated, and then the attached application program is installed on the host PC 400. Then, after the operation manual file 306 is copied into the host PC 400 as required, the installer file 302 and the application program file 304 are deleted from the image memory 218 in S740. As a result, the image memory 218 can be effectively utilized as a space to store image files. If the operation manual file 306 is deleted too, the image memory 218 can be utilized more effectively. Moreover, since the attached application program is automatically installed, the need for the user to perform complicated operations to install programs is eliminated.

Second Embodiment

In the second embodiment of the present invention, likewise the first embodiment, explanations will be made on an example where the server connected to the host PC 400 via the network NW is the server 500 shown in FIG. 5A. Also, likewise the first embodiment, when the camera 200 is connected to the host PC 400, the procedure shown in FIG. 6 is executed by the processing unit 414 by means of the functions incorporated in the OS of the host PC 400.

Figure 8:
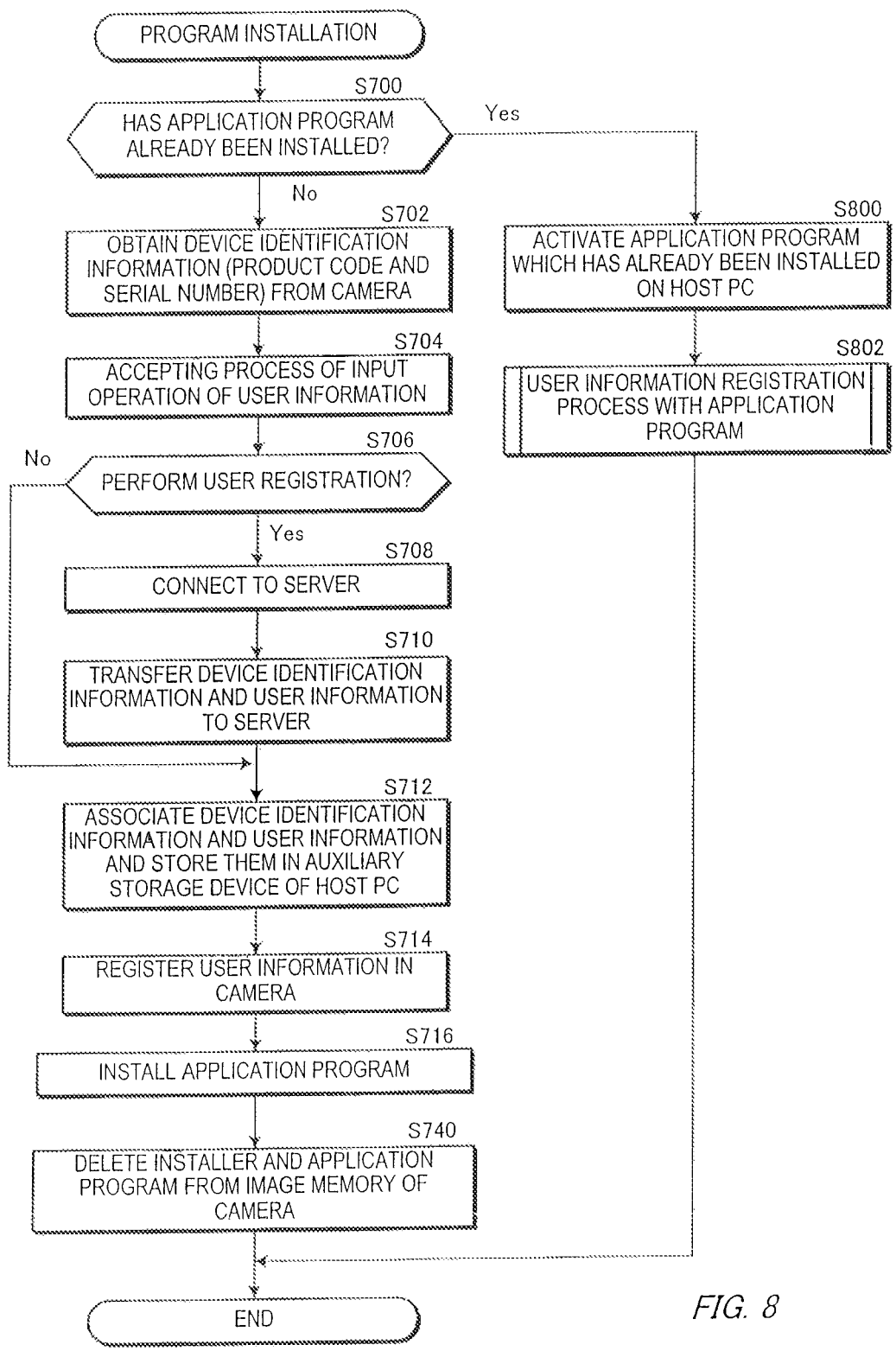
FIG. 8 is a flowchart describing a second embodiment of the present invention wherein, an install program in the image memory of the camera is executed on the host PC, as a result of execution of the procedure shown in the flowchart of FIG. 6.

FIG. 8 is a schematic flowchart illustrating the procedure wherein, as a result of execution of the procedure of FIG. 6, the processing unit 414 of the host PC 400 loads the program stored in the installer file 302 into the RAM 416 and automatically executes it.

In the flowchart of FIG. 8, the processes performing the same processes as those of S700 to S716, and that of S740 following S716, shown in the flowchart of FIG. 7 are denoted by the same step numerals as those of FIG. 7, and the explanations thereof are omitted.

In the flowchart of FIG. 8, what is different from that of FIG. 7 is the processes taken when it is determined as Yes in S700. That is to say, if it is determined in S700 that the attached application program has already been installed, the process proceeds to S800. In S800, the processing unit 414 activates the attached application program that has already been installed on the host PC 400. In S802, by means of the attached application program activated in S800, the processing unit 414 performs user information registration. More specifically, in the second embodiment, the attached application program that is installed on the host PC 400 includes a process to perform user information registration. The procedure for user information registration performed in S802 is illustrated in FIG. 9.

Figure 9:
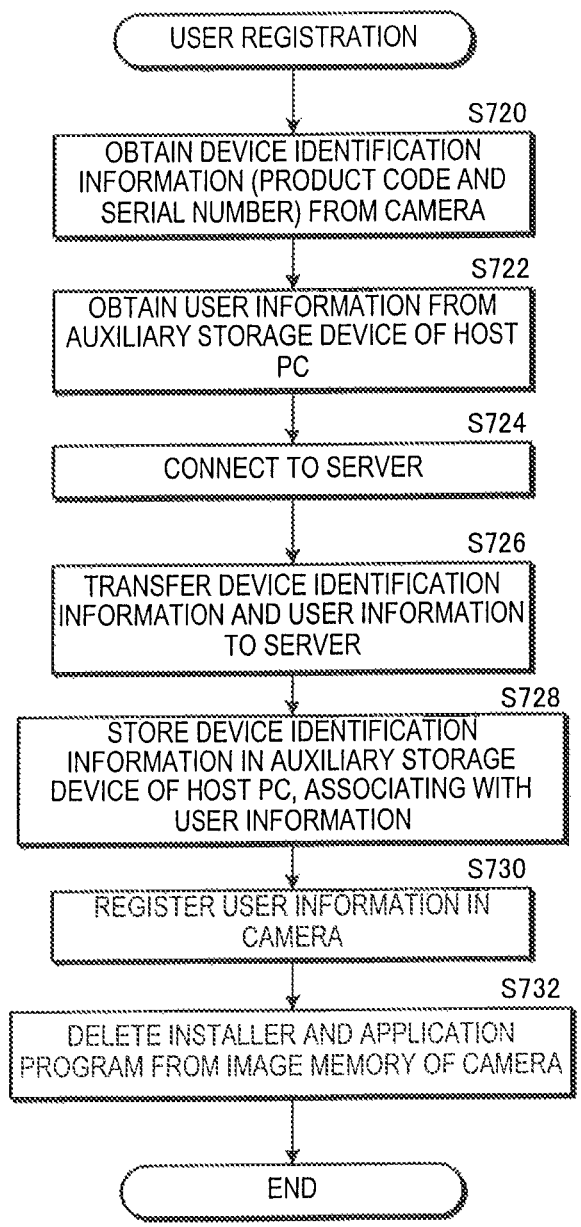
FIG. 9 is a flowchart describing the second embodiment of the present invention wherein, the install program is installed as the attached application program in the procedure shown in the flowchart of FIG. 8 and executed on the host PC.

In the procedure illustrated in FIG. 9, the processes performing the same processes as those of S720 to S730 of FIG. 7 are denoted by the same step numerals as those of FIG. 7, and the explanations thereof are omitted.

The processing unit 414 retrieves the device identification information from the additionally-purchased camera 200 (S720), and the user information from the authentication information storage unit 422 of the host PC 400 (S722). Then, the processing unit 414 is connected to the server 500 via the network NW (S724), and transfers the device identification information and the user information to the server 500 (S726). In the server 500, the device identification information corresponding to the additionally-purchased camera 200 is additionally stored in the user information storage unit 526, and the registered content of the user management database 516 is also updated.

Here, a process to let the user determine whether the user performs the user registration for the additionally-purchased camera 200 may be performed between the processes of S722 and S724. Then, if the user does not want to perform the user registration for the additionally-purchased camera 200, the processes of S724 and S726 may be skipped to execute S728 and the following processes.

The processing unit 414 additionally stores the device identification information corresponding to the additionally-purchased camera 200 in the authentication information storage unit 422 of the host PC 400 (S728), and registers the user information in the authentication information storage unit 202 of the camera 200 (S730). At that time, likewise the process of S714 explained with reference to FIG. 7, the host PC 400 can retrieves the setting information such as the language setting, time setting, time zone, etc., and based on the setting information, the language setting, time setting, time zone setting, etc. of the camera 200 can be set. Moreover, if necessary, the operation manual file 306 stored in the image memory 218 of the camera 200 can be copied into the auxiliary storage device 418 of the host PC 400.

In S732, the processing unit 414 deletes the installer file 302 and the application program file 304 stored in the image memory 218 of the camera 200. Also, the operation manual file 306 may be deleted too. At that time, the processing unit 414 preferably keeps backup files for the files 302 and 304, and for the operation manual file 306 if necessary, in a folder in the auxiliary storage device 418. After the process of S732, the series of processes for user information registration shown in FIG. 8 is completed.

As explained with respect to the first embodiment, if the camera 200 is equipped with a storage medium such as a CD-ROM and the files 302, 304, 306 are stored therein, the backup process described above is not necessarily required. Also, if those files 302, 304, 306 can be downloaded from a server via a network, the above-described backup process is not necessarily needed.

In the second embodiment, if it is determined in S700 that the attached application program has already been installed on the host PC 400, it is avoided to redundantly install the same attached application program. Thus, the redundant installation of the same attached application program or any problem arising therefrom can be limited.

As explained with respect to the first embodiment, a process to check the version of the application program file 304 stored in the image memory 218 of the additionally-purchased camera 200 can be added during, before or after the processes of S720 to S730. In this case, if the program versions are different, the normal update or the differential update may be performed, and if there is no difference, the normal update or the differential update may be skipped. If the server 500 issues a password, the process similar to that explained with respect to the first embodiment can be performed.

The timing of deletion of the installer file 302 and the application program file 304 in the image memory 218 of the camera 200 can also be as such explained with respect to the first embodiment.

As described above, according to the second embodiment of the present invention, the processes explained with reference to FIG. 8 are automatically executed when the user connects the camera 200 to the host PC 400 for the first time after the purchase. Then, at the time of the user registration, the device identification information is automatically retrieved from the camera 200, and therefore, what the user needs to input is only the user information. Then, if the user decided to perform the user registration, based on the device identification information automatically retrieved and the user information input by the user, the user registration will be completed when the user clicks a button saying "Proceed with user registration". At that time, since the attached application program is automatically installed on the host PC 400, the need for the user to perform complicated operations to install softwares is eliminated.

Moreover, when the user additionally purchases a camera 200 and connects it to the host PC 400 for the first time, the processes explained with reference to FIGS. 8 and 9 are automatically executed. The processes shown in FIG. 9 are performed by the attached application program installed on the host PC 400. As described above, the user information has been stored in the authentication information storage unit 422 of the host PC 400 when the originally-purchased camera 200 was connected to the host PC 400 for the first time. Thus, likewise the first embodiment, at the time of the user registration for the additionally-purchased camera 200, there is no need for the user to input the user information.

The automatic execution program (the program that executes program installation of FIG. 8) described above is activated, and then the attached application program is installed on the host PC 400. Then, after the operation manual file 306 is copied into the host PC 400 as required, the installer file 302 and the application program file 304 are deleted from the image memory 218 in S740. As a result, the image memory 218 can be effectively utilized as a space to store image files. If the operation manual file 306 is also automatically deleted, the image memory 218 can be utilized more effectively.

Third Embodiment

In the third embodiment of the present invention, likewise the first embodiment, explanations will be made on an example where the server connected to the host PC 400 via the network NW is the server 500 shown in FIG. 5A. Also, likewise the first embodiment, when the camera 200 is connected to the host PC 400, the procedure shown in FIG. 6 is executed by the processing unit 414 by means of the functions incorporated in the OS of the host PC 400.

Figure 10A:
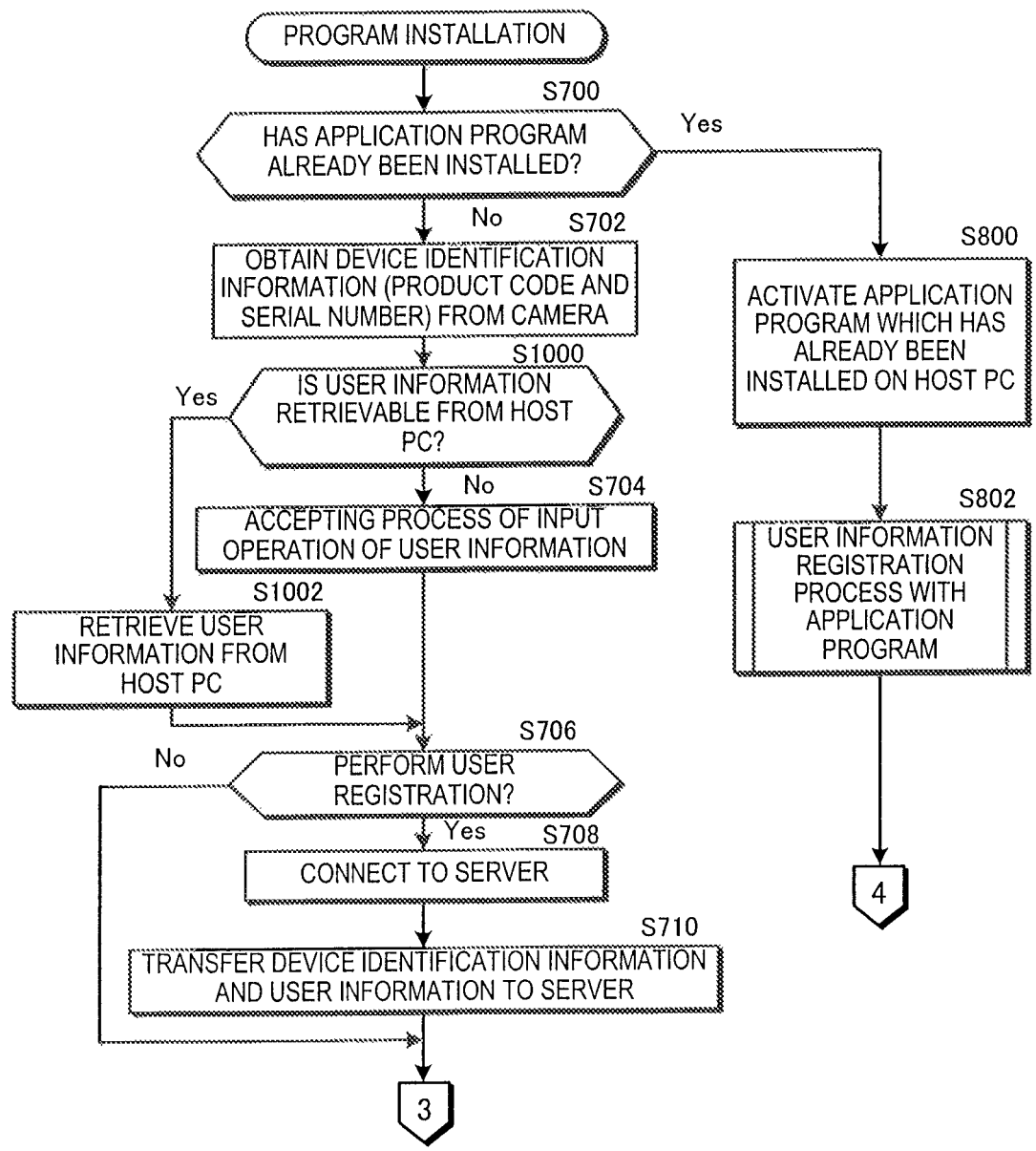
FIG. 10A is a flowchart describing a third embodiment of the present invention wherein, an install program in the image memory of the camera is executed on the host PC, as a result of execution of the procedure shown in the flowchart of FIG. 6.
Figure 10B:
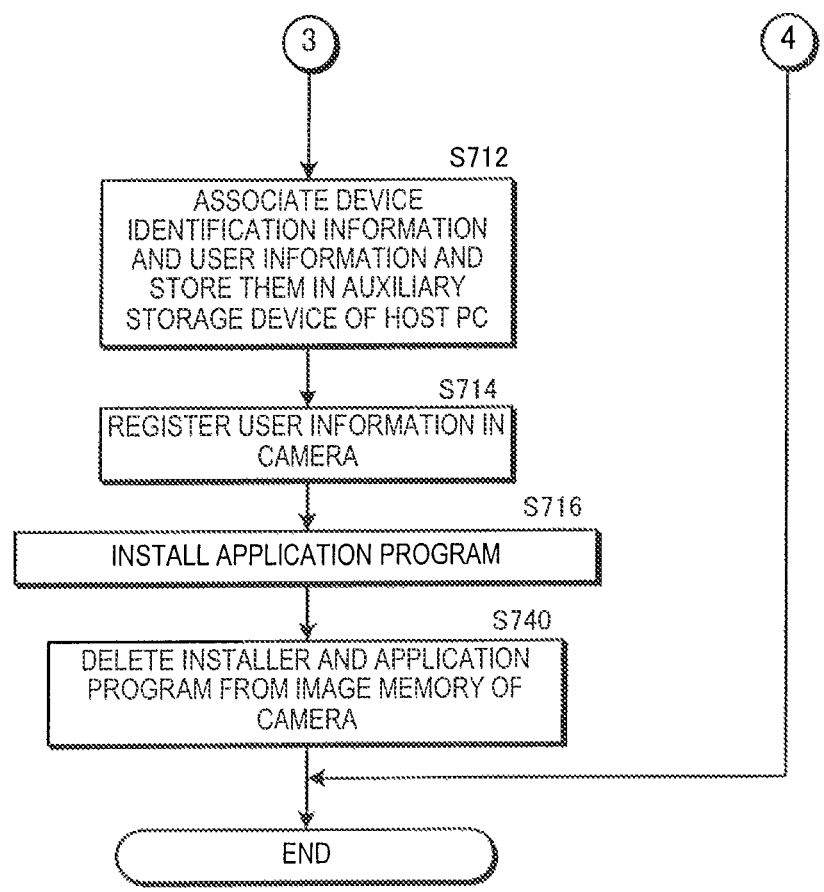
FIG. 10B is a flowchart following that of FIG. 10A.

FIGS. 10A and 10B are schematic flowcharts illustrating the procedure wherein, as a result of execution of the procedure of FIG. 6, the processing unit 414 of the host PC 400 loads the program stored in the installer file 302 into the RAM 416 and automatically executes it.

In the flowchart of FIG. 10, the processes performing the same processes as those of S700 to S716, and that of S740 following S716, shown in the flowchart of FIG. 7 are denoted by the same step numerals as those of FIG. 7. The processes of S800 and S802 are the same as those of S800 and S802 shown in FIG. 8. The procedure for the user information registration in S802 is shown in FIG. 9. Now, with reference to FIG. 10, explanations will be made mainly with respect to the differences from the first and second embodiments.

In the third embodiment, a determination process of S1000 is added between S702 (the process to retrieve the device identification information from the camera 200) and S704 (the process to accept input operation of user information). Furthermore, the process of S1002 that is taken when it is determined as Yes in S1000 is added. These two processes added are the difference from the second embodiment.

When the user connects the originally-purchased camera 200 to the host PC 400 for the first time, it is determined as No in S700, and the processing unit 414 retrieves the device identification information from the authentication information storage unit 202 of the camera 200 in S702. Then, in the following S1000, the processing unit 414 determines whether the user information is retrievable from the host PC 400. More specifically, the processing unit 414 determines, at least, either of whether the information on the login username is retrievable from the host PC 400, or whether the information on the user's e-mail address is retrievable. For example, the information on the login username can be found by searching through the registry. The user's e-mail address can be found by searching through the files, etc. managed by a software which may hold the information on the user's e-mail address, such as an e-mail software used by the host PC 400.

If it is determined as No in S1000, i.e., the above mentioned user information was not found in the host PC 400, in S704, an input screen promoting input of user information including the user name, e-mail address, etc. is displayed, and performs a process to accept input operation of the user information by the user. On the other hand, if it is determined as Yes in S1000, the processing unit 414 retrieves, in S1002, the above-described user information from the host PC 400.

Then, if it is determined in S706 that the user wants to perform the user registration, the device identification information and the user information are transferred to the server 500 by the processes of S708 and S710. If the user does not want to perform the user registration (S706: No), the processes of S708 and S710 are skipped.

In S712, the device identification information and the user information are stored in the authentication information storage unit 422 of the host PC 400. In S714, the user information is registered in the authentication information storage unit 202 of the camera 200. In S716, a process for installing the attached application program stored in the image memory 218 of the camera 200 on the host PC 400 is performed. In S740, a process for deleting the installer file 302 and the application program file 304 from the image memory 218 is performed. At that time, as explained with respect to the first and second embodiments, backup files for the installer file 302 and the application program file 304 can be kept in the auxiliary storage device 418 of the host PC 400, for formatting of the image memory 218. Whether the operation manual file 306 is copied into the host PC 400, and whether it is deleted from the image memory 218 are determined in the same manner explained with respect to the first and second embodiments.

The processes of S800 and S802 taken when it is determined in S700 that the attached application program has already been installed are as explained with respect to the second embodiment. More specifically, the attached application program that has already been installed on the host PC 400 is activated in S800, and the process of S802 for the user information registration shown in FIG. 9 is executed. Moreover, if the server 500 issues a password upon user registration, a process similar to that explained with respect to the first embodiment can be taken.

The timing of deletion of the installer file 302 and the application program file 304 in the image memory 218 of the camera 200 can also be as such explained with respect to the first embodiment.

As described above, according to the third embodiment of the present invention, the processes explained with reference to FIG. 10 are automatically executed when the user connects the originally-purchased camera 200 to the host PC 400 for the first time. Then, at the time of the user registration, the device identification information is retrieved from the camera 200, and if it is determined that the user information is retrievable from the host PC 400, it is automatically retrieved. The user information retrieved here, for example, may be displayed as the default value (default information) on a screen for accepting input operation of the user information on the display unit 406. Having a look of the default value (default information), the user may perform the user registration without troublesome input of e-mail address if the user does not need a change thereof. On the other hand, if the user wants to change the user information, an arbitrary user name or e-mail address can be input.

Accordingly, the number of the key input operations for the user at the time of the user registration can be reduced as much as possible, and therefore, the user registration is smoothly performed by the user. Moreover, when the user additionally purchases a camera 200 and performs user registration therefor, likewise the first and second embodiments, the need of inputting the user information is eliminated.

Furthermore, after the automatic installation process of the attached application program, the installer file 302 and the application program file 304 are automatically deleted from the image memory 218 of the camera 200. Thus, the image memory 218 can be effectively utilized as a space to store image files. If the operation manual file 306 is also automatically deleted, the image memory 218 can be utilized more effectively.

Fourth Embodiment

In the fourth embodiment of the present invention, different from the first to third embodiments, explanations will be made on an example where the server connected to the host PC 400 via the network NW is the server 500A shown in FIG. 5B. Different from the server 500 of FIG. 5A, the server 500A further includes the software database 530 in the auxiliary storage device 512. The details of the software database 530 are as explained with reference to FIG. 5B. When the camera 200 is connected to the host PC 400, the processing unit 414 performs the procedure shown in FIG. 6 by means of the functions incorporated into the OS of the host PC, likewise the first to third embodiments.

Figure 11A:
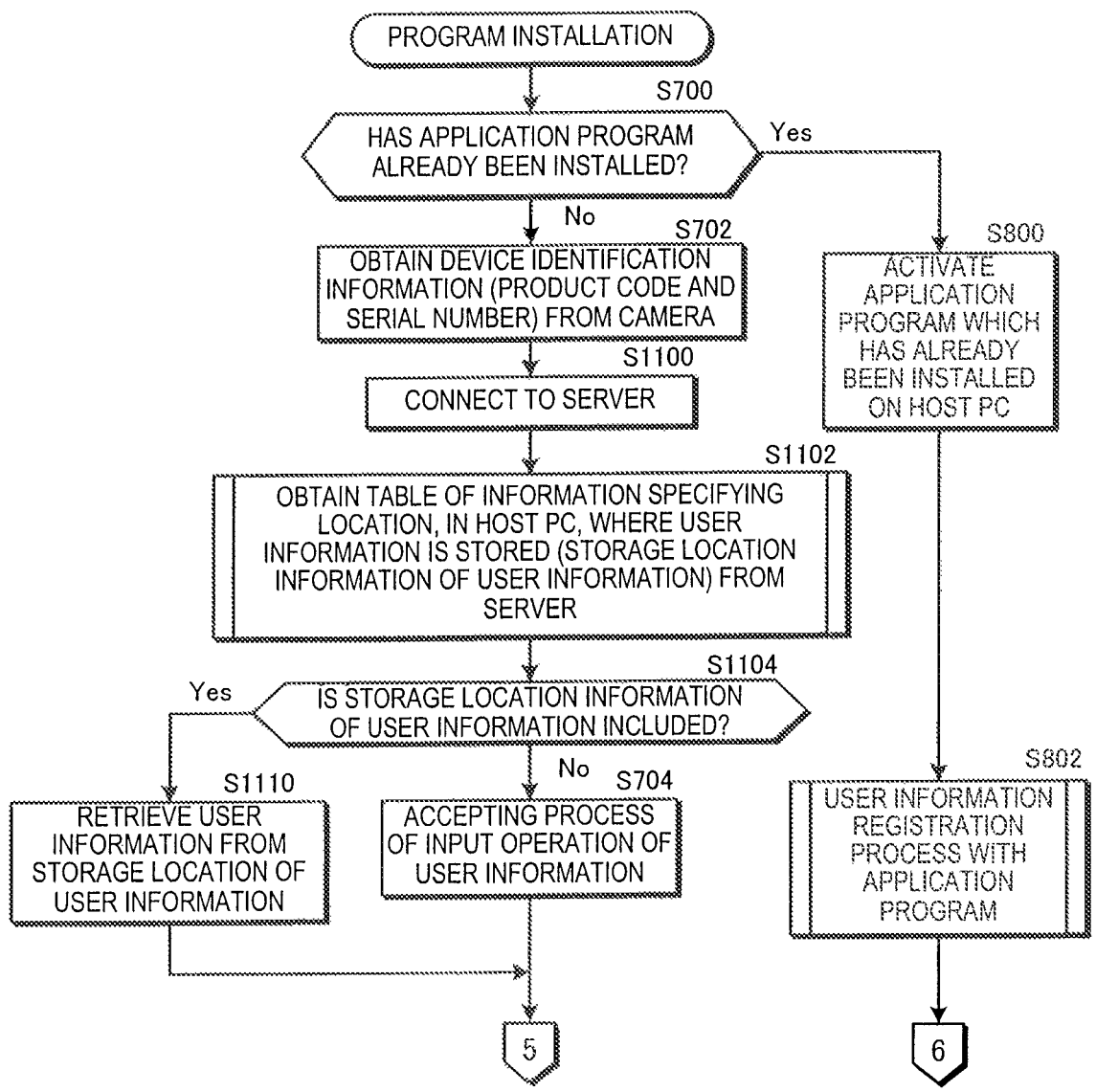
FIG. 11A is a flowchart describing a fourth embodiment of the present invention wherein, an install program in the image memory of the camera is executed on the host PC, as a result of execution of the procedure shown in the flowchart of FIG. 6.
Figure 11B:
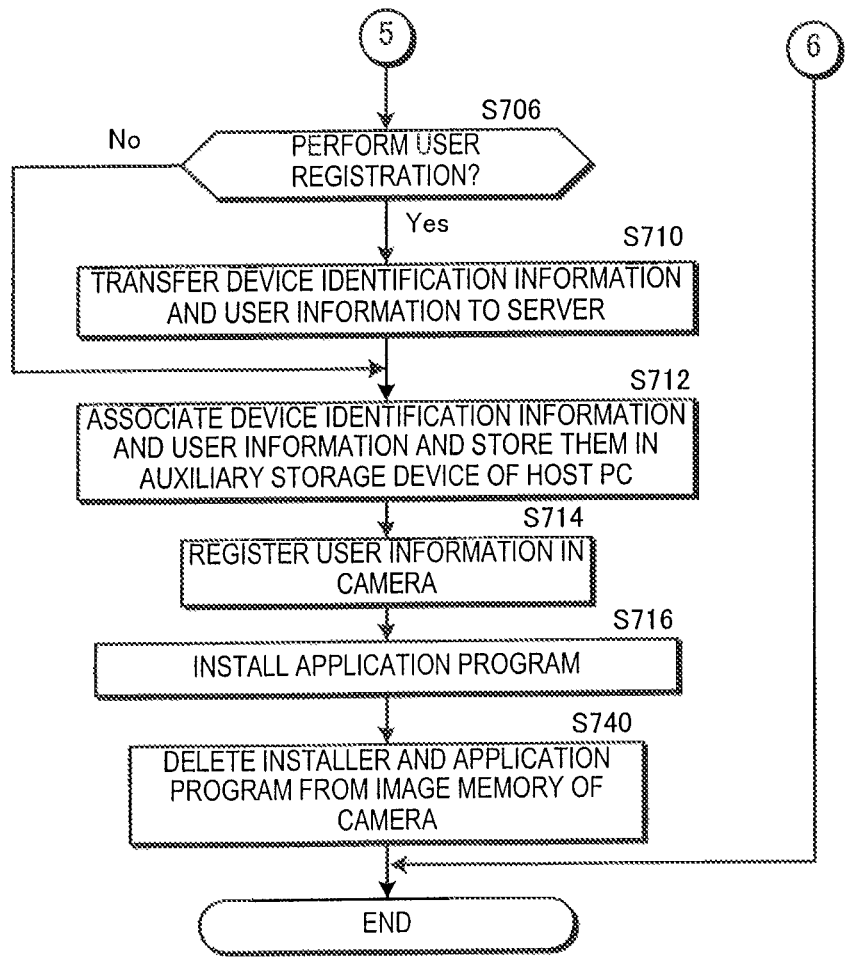
FIG. 11B is a flowchart following that of FIG. 11A.

FIGS. 11A and 11B are schematic flowcharts illustrating the procedure wherein, as a result of execution of procedure of FIG. 6, the processing unit 414 of the host PC 400 loads the program stored in the installer file 302 into the RAM 416 and automatically executes it.

In the flowcharts of FIG. 11, the processes performing the same processes as those of S700 to S716, and that of S740 following S716, shown in the flowchart of FIG. 7 are denoted by the same step numerals as those of FIG. 7. Now, with reference to FIG. 11, explanations will be made mainly with respect to the differences from the first to third embodiments.

Comparing the flowcharts of FIG. 7 and FIG. 11, in the fourth embodiment, the processes of S1100, S1102, S1104 are added between S702 (the process to retrieve the device identification information from the camera 200) and S704 (the process to accept input operation of user information). Moreover, a process of S1110 that is taken if it is determined as Yes in S1104 is added. Here, connection to the server 500A is performed in S1100, and therefore, the server connection process of S708 in the flowcharts of FIG. 7 is omitted. The processes of S720 to S730 of FIG. 7 are replaced with those of S800 and S802, as is shown in FIG. 8. The procedure of S802 for the user information registration is illustrated in FIG. 9.

When the user connects the originally-purchased camera 200 to the host PC 400 for the first time, it is determined as No in S700, and the processing unit 414 retrieves the device identification information from the authentication information storage unit 202 of the camera 200 in S702. In the following S1100, the processing unit 414 performs a process to connect the host PC 400 to the server 500A via a network. In the following S1102, the processing unit 414 performs a process to retrieve the storage location information of the user information from the server 500A.

Now, the storage location information of the user information will be explained. The storage location information of the user information is information to identify where in the host PC 400 the user information is stored. The user information includes at least either of the login username or the user's e-mail address. On the host PC 400, a variety of types and versions of OSes or e-mail softwares are used, and the user information is also stored in a variety of locations. Furthermore, those OSes or e-mail softwares are constantly updated and new versions of them are provided. In the third embodiment explained above, the storage location information of the user information prepared based on the information that was available before the release of the camera 200 can be included in the attached application program. On the other hand, in the fourth embodiment, the storage location information of the user information can be updated to the latest version by the server 500A, as required. Furthermore, the fourth embodiment is advantageous in that the storage location information of the user information that corresponds to more various types of OSes, e-mail softwares, etc. can be registered in the software database.

Figure 12:
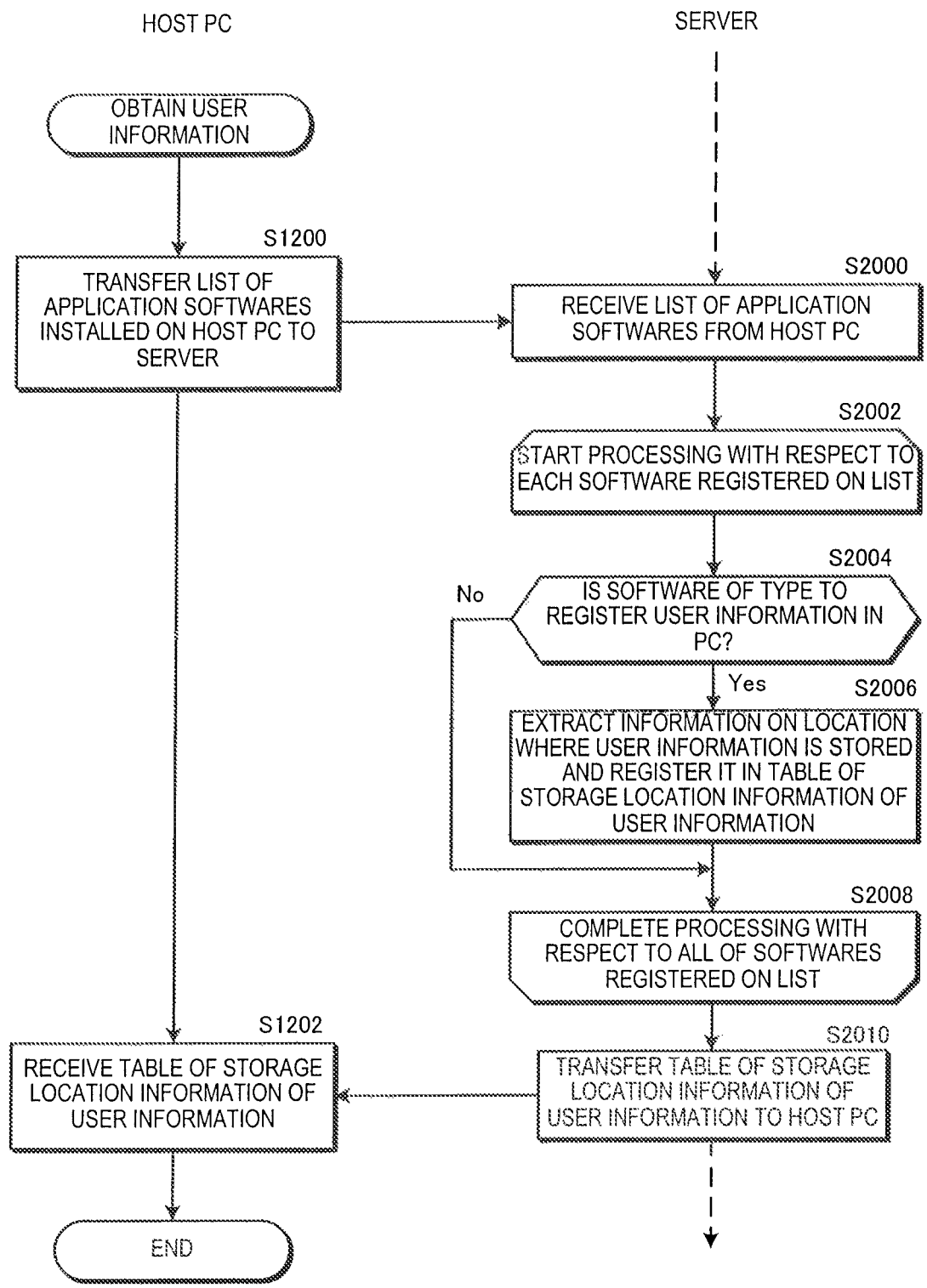
FIG. 12 is a flowchart illustrating details of processes performed by the host PC in one of the steps shown in the flowchart of FIG. 11, together with a process performed by the server.

FIG. 12 is a flowchart illustrating the content of the process of S1102 shown in FIG. 11 performed by the processing unit 414, together with the content of the process performed by the server 500A. In S1200, the processing unit 414 searches for the application softwares (a spreadsheet software, word processor software, e-mail client software, graphic software, etc.) installed on the host PC 400, prepares a list, and transfers the list to the server 500A. For example, it is possible to search for a file of a certain format that is stored in a certain directory in the auxiliary storage device 418 of the host PC 400, and prepare a list including information on the name, creation date, etc. of the file. The list prepared in S1200 may include the information, not only on the application softwares mentioned above, but also on types, versions, etc. of the OS.

In S2000, the server 500A receives the list of the application softwares from the host PC 400. Then, the server 500A repeatedly performs the processes of S2004 and S2006, described below, with respect to the respective information included in the list.

In S2004, the server 500A refers to the software database 530, and determines whether the objective software is of the type to register the user information such as an e-mail address in the host PC 400. If it is determined as Yes in S2004, the server 500A extracts in S2006 the storage location information of the user information corresponding to the objective software from the software database 530, and registers it in the table of storage location information of the user information. If the list of application softwares includes the information on the OS name or its version, with respect to the information, the server 500A extracts the storage location information of the user information from the software database 530, and stores it in the table of the storage location information of the user information.

After the compilation of the process of S2006, or if it is determined as No in S2004, the server 500A performs the processes of S2004 and S2006 with respect to the next item in the list of the application softwares. Then, after the determination is made with respect to all items in the list of the application softwares, the loop of processes from S2002 to S2008 stops. In S2010, the server 500A transfers the table of the storage location information of the user information to the host PC 400. In S1202, the host PC 400 receives the table of the storage location information of the user information transferred by the server 500A. As described above, the processes of S1200 and S1202 are performed in S1102 (FIG. 11).

Now, the explanation is made with reference to the flowchart of FIG. 11, again. In S1104, the processing unit 414 refers to the table of storage location information of the user information transferred by the server 500A, and determines whether the table includes the storage location information of the user information. If it is determined as Yes in S1104, the processing unit 414 retrieves (extracts), in S1110, the user information from a storage location in the host PC 400 that is specified by the storage location information of the user information. At that time, if the table includes plural location information of the user information, among those, the user information of an application software that was installed last can be selected. Alternatively, more than one piece of user information that can be retrieved from the host PC 400 may be displayed on the display unit 406 to accept the user select.

If it is determined as No in S1104, that is to say, if the table of the storage location information of the user information transferred by the server 500A includes no valid storage location information of the user information, the processing unit 414 displays, in S704, an input screen for promoting input of the user information including the user name, e-mail address, etc. on the display unit 406, and accepts the input operation of the user information by the user.

Following the process of S704 or S1110, if it is determined in S706 that the user wants to perform the user registration, the device identification information and the user information are transferred to the server 500A in S710. If the user does not want to perform user registration (S706: No), the process of S710 is skipped.

In S712, the device identification information and the user information are stored in the authentication information storage unit 422 of the host PC 400. In S714, the user information is registered in the authentication information storage unit 202 of the camera 200. In S716, the process for installing the attached application program stored in the image memory 218 of the camera 200 on the host PC 400 is performed, and in S740, the process for deleting the installer file 302 and the application program file 304 from the image memory 218 is performed. At that time, as described with respect to the first and second embodiments, backup files for the installer file 302 and the application program file 304 can be kept in the auxiliary storage device 418 of the host PC 400, for formatting of the image memory 218. Whether the operation manual file 306 is copied into the host PC 400, and whether it is deleted from the image memory 218 are determined in the same manner explained with respect to the first and second embodiments. Also, if the server 500 issues a password upon user registration, a process similar to that explained with respect to the first embodiment may be executed.

The processes of S800, S802 performed when it is determined in S700 that the attached application program has already been installed are as explained with respect to the second embodiment. More specifically, the attached application program that has already been installed on the host PC 400 is activated in S800, and the process of S802 for the user information registration shown in FIG. 9 is executed.

The timing of deletion of the installer file 302 and the application program file 304 stored in the image memory 218 of the camera 200 can also be as such explained with respect to the first embodiment.

As described above, according to the fourth embodiment of the present invention, the server 500A refers to the software database 530 to determine whether any one of the application softwares installed on the host PC 400 is of a type to register the user information in the host PC 400. Then, if it is determined that there is an application software of a type to register the user information, the server 500A extracts the storage location information of the user information corresponding to the application software from the database 530, and transfers a table of the storage location information of the user information to the host PC 400. As described above, since the registered content of the software database 530 can be constantly updated based on the latest information, it becomes possible to retrieve the user information from the host PC 400 more precisely.

Accordingly, at the time of the user registration, there will be even less necessity for the user to input the user information. Moreover, likewise the third embodiment, the user information retrieved from the host PC 400 may be displayed as the default value on a screen for accepting input operation of the user information, which is displayed on the display unit 406. Having a look of the default value, the user can perform the user registration without troublesome input of e-mail address if the user does not need a change thereof. On the other hand, if the user wants to change the user information, an arbitrary user name or e-mail address can be input.

Accordingly, the number of the key input operations for the user at the time of the user registration can be reduced as much as possible, and therefore, the user registration can be smoothly performed by the user. Moreover, when the user additionally purchases a camera 200 and performs user registration therefor, likewise the first and second embodiments, the need of inputting the user information is eliminated.

Furthermore, after the automatic installation process of the attached application program, the installer file 302 and the application program file 304 are automatically deleted from the image memory 218 of the camera 200. Thus, the image memory 218 can be effectively utilized as a space to store image files. If the operation manual file 306 is also automatically deleted, the image memory 218 can be utilized more effectively.

Although the above specification provides a description of embodiments of the present invention, it should be understood that those embodiments are mere examples of the applications of the present invention and do not limit the technical scope of the present invention to their specific configurations.

What is claimed is:

1. A non-transitory computer-readable storage medium storing a user information registration program and used as a first memory of a terminal unit, the program being transferred to a host device to which the terminal unit is connected and executed on the host device, wherein the terminal unit inputs information and the first memory stores the input information, the program comprising first and second programs, wherein:

the first program is loaded and automatically activated on the host device when the terminal unit is connected to the host device, and the first program causes the host device to execute a step of determining whether the second program is already installed on the host device;

(a) if it is determined in the step of determining that the second program is not installed on the host device, the first program causes the host device to execute:

(a-1) a step of retrieving, from the terminal unit, device identification information that identifies the terminal unit, (a-2) a step of obtaining user information, the step at least performing either searching for user information through the host device, or displaying an input screen that promotes input of the user information and accepting input operation of the user information by the user, (a-3) a step of storing, in a second memory of the host device, the device identification information and the user information obtained by the step of obtaining user information, associating the device identification information and the user information to each other, (a-4) a step of transferring, to a server via a network, the device identification information and the user information obtained by the step of obtaining user information, and (a-5) a step of installing the second program on the host device;

(b) if it is determined by the step of determining that the second program is installed on the host device, the first program causes the host device to execute a step of activating the second program and:

(b-1) a second step of retrieving device identification information from the terminal unit, (b-2) a step of retrieving user information stored in the second memory, (b-3) a second step of transferring, to the server via the network, the device identification information retrieved by the second step of retrieving device identification information and the user information retrieved by the step of retrieving user information, and (b-4) a second step of additionally storing, in the second memory, the device identification information retrieved by the second step of retrieving device identification information, by associating the device identification information with the user information.

2. The non-transitory computer-readable storage medium as defined in claim 1, wherein the first program further causes the host device to execute:

a first step of deleting the first program from the first memory, and a second step of deleting the second program from the first memory both after completion of installation process of the second program on the host device and after it is determined that the second program is installed.

3. The non-transitory computer-readable storage medium as defined in claim 1, wherein, in the step of obtaining user information, a process of searching for the user information through the host device includes;

a process of determining whether a plurality of application programs installed on the host device include an application program storing the user information in the host device, and a process of retrieving the user information stored by the application program from the host device if it is determined that there is an application program storing user information in the host device, while if it is determined that there is no application program storing the user information in the host device, displaying an input screen that promotes input of the user information and accepting input operation of the user information by the user.

4. The non-transitory computer-readable storage medium as defined in claim 1, wherein, in the step of obtaining the user information, a process of searching for the user information through the host device includes;

a process of transferring, to a predetermined server via a network, information that identifies application programs installed on the host device, a process of receiving response information transferred by the server in response to the transferred information that identifies application programs, and a process of retrieving the user information from a storage location identified by a storage location information of the user information if it is determined that the received response information includes storage location information of the user information for identifying the storage location of user information stored in the host device by any one of the application programs installed on the host device, while if it is determined that the received response information does not include the storage location information of the user information, displaying an input screen that promotes input of the user information and accepting input operation of the user information by the user.

5. The non-transitory computer-readable storage medium as defined in claim 1, wherein the user information includes at least either of a user name or an e-mail address.

6. The non-transitory computer-readable storage medium as defined in claim 1, wherein the terminal unit is a camera, and the first memory is a memory for storing image data captured by the camera.

7. A non-transitory computer-readable storage medium storing a user information registration program and used as a first memory of a terminal unit, the program being transferred to a host device to which the terminal unit is connected and executed on the host device, wherein the terminal unit inputs information and the first memory stores the input information, the program comprising first and second programs, wherein;

the first program is loaded and automatically activated on the host device when the terminal unit is connected to the host device, and the first program causes the host device to execute a step of determining whether the second program is already installed on the host device;

(a) if it is determined in the step of determining that the second program is not installed on the host device, the first program causes the host device to execute:

(a-1) a step of retrieving, from the terminal unit, device identification information that identifies the terminal unit, (a-2) a step of obtaining user information, the step at least performing either searching for user information through the host device, or displaying an input screen that promotes input of the user information and accepting input operation of the user information by the user, (a-3) a step of storing, in a second memory of the host device, the device identification information and the user information obtained by the step of obtaining user information, (a-4) a step of transferring, to a server via a network, the device identification information and the user information obtained by the step of obtaining user information, and (a-5) a step of installing the second program on the host device, while (b) if it is determined by the step of determining that the second program is installed on the host device, the first program causes the host device to execute a step of activating the second program, and the second program causes the host device to execute:

a second step of retrieving device identification information from the terminal unit, a step of retrieving user information stored in the second memory, a second step of transferring, to the server via the network, the device identification information retrieved by the second step of retrieving device identification information and the user information retrieved by the step of retrieving user information, and a second step of additionally storing, in the second memory, the device identification information retrieved by the second step of retrieving device identification information, by associating it with the user information.

8. The non-transitory computer-readable storage medium as defined in claim 7, wherein when the step of installing is completed, the first program further causes the host device to execute a step of deleting at least the second program, between the first and second programs, from the first memory; and wherein the second program further causes the host device to execute a second step of deleting the first and second programs from the first memory.

9. The non-transitory computer-readable storage medium as defined in claim 7, wherein the first program further causes the host device to execute a step of registering, in the terminal unit, the user information obtained by the step of obtaining the user information; and wherein the second program further causes the host device to execute a second step of registering, in the terminal unit, the user information retrieved by the step of retrieving the user information.

10. The non-transitory computer-readable storage medium as defined in claim 7, wherein, in the step of obtaining user information, a process of searching for the user information through the host device includes;

a process of determining whether a plurality of application programs installed on the host device include an application program storing the user information in the host device, and a process of retrieving the user information stored by the application program from the host device if it is determined that there is an application program storing user information in the host device, while if it is determined that there is no application program storing the user information in the host device, displaying an input screen that promotes input of the user information and accepting input operation of the user information by the user.

11. The non-transitory computer-readable storage medium as defined in claim 7, wherein, in the step of obtaining the user information, a process of searching for the user information through the host device includes;

a process of transferring, to a predetermined server via a network, information that identifies application programs installed on the host device, a process of receiving response information transferred by the server in response to the transferred information that identifies application programs, and a process of retrieving the user information from a storage location identified by a storage location information of the user information if it is determined that the received response information includes storage location information of the user information for identifying the storage location of user information stored in the host device by any one of the application programs installed on the host device, while if it is determined that the received response information does not include the storage location information of the user information, displaying an input screen that promotes input of the user information and accepting input operation of the user information by the user.

12. The non-transitory computer-readable storage medium as defined in claim 7, wherein the user information includes at least either of a user name or an e-mail address.

13. The non-transitory computer-readable storage medium as defined in claim 7, wherein the terminal unit is a camera, and the first memory is a memory for storing image data captured by the camera.

14. A user information registration method using:

a terminal unit including a first memory for storing input information, the first memory storing first and second programs, and a host device to which the terminal unit is connected, wherein the first program is an automatic execution program that is automatically transferred to the host device when the terminal unit is connected to the host device, and executed on the host device, and the method comprises:

retrieving the first program from the first memory and starting to execute the first program when the terminal unit is connected to the host device;

determining by means of the first program whether the second program is already installed on the host device, (a) if it is determined in the step of determining that the second program is not installed on the host device, by means of the first program;

(a-1) retrieving, from the terminal unit, device identification information that identifies the terminal unit, (a-2) obtaining user information, by at least performing either searching for user information through the host device, or displaying an input screen that promotes input of the user information and accepting input operation of the user information by the user, (a-3) associating the device identification information and the user information obtained by the obtaining of user information and storing the device identification information and the user information in a second memory of the host device, (a-4) transferring, to a server via a network, the device identification information and the user information obtained by the obtaining of user information, and (a-5) installing the second program on the host device;

(b) if it is determined by the determining that the second program is installed on the host device, activating the second program, and by means of the first program:

(b-1) retrieving device identification information from the terminal unit, (b-2) retrieving user information stored in the second memory, (b-3) transferring, to the server via the network, the device identification information retrieved by the retrieving in (b-1) and the user information retrieved by the retrieving in (b-2), and (b-4) additionally storing, in the second memory, the device identification information retrieved by the retrieving in (b-1), by associating it with the user information.

15. The user information registration method as defined in claim 14, further comprising:

by means of the first program, deleting the first program from the first memory, and deleting the second program from the first memory both after installation process of the second program on the host device is completed, and after it is determined that the second program is installed.

16. The user information registration method as defined in claim 14, wherein, in the obtaining of the user information,
   a process of searching for the user information through the host device includes;
   a process of determining whether a plurality of application programs installed on the host device include an application program storing the user information in the host device, and
   a process of retrieving the user information stored by the application program from the host device if it is determined that there is an application program storing user information in the host device, while
   if it is determined that there is no application program storing the user information in the host device, displaying an input screen that promotes input of the user information and accepting input operation of the user information by the user.

17. The user information registration method as defined in claim 14, wherein, in the step of obtaining the user information,
   a process of searching for the user information through the host device includes;
   a process of transferring, to a predetermined server via a network, information that identifies application programs installed on the host device,
   a process of receiving response information transferred by the server in response to the transferred information that identifies application programs, and
   a process of retrieving the user information from a storage location identified by a storage location information of the user information if it is determined that the received response information includes storage location information of the user information for identifying the storage location of user information stored in the host device by any one of the application programs installed on the host device, while
   if it is determined that the received response information does not include the storage location information of the user information, displaying an input screen that promotes input of the user information and accepting input operation of the user information by the user.

18. The user information registration method as defined in claim 14, wherein the user information includes at least either of a user name or an e-mail address.

19. The user information registration method as defined in claim 14, wherein
   the terminal unit is a camera, and
   the first memory is a memory for storing image data captured by the camera.

20. A user information registration method using:
   a terminal unit including a first memory for storing input information, the first memory storing first and second programs, and
   a host device to which the terminal unit is connected, wherein
      the first program is an automatic execution program that is automatically transferred to the host device when the terminal unit is connected to the host device, and executed on the host device, and
      the method comprises;
      retrieving the first program from the first memory and starting to execute the first program when the terminal unit is connected to the host device;
      determining by means of the first program whether the second program is already installed on the host device,
      (a) if it is determined in the step of determining that the second program is not installed on the host device, by means of the first program;
      (a-1) retrieving, from the terminal unit, device identification information that identifies the terminal unit,
      (a-2) obtaining user information, by at least performing either searching for user information through the host device, or displaying an input screen that promotes input of the user information and accepting input operation of the user information by the user,
      (a-3) storing, in a second memory of the host device, the device identification information and the user information obtained by the obtaining of user information,
      (a-4) transferring, to a server via a network, the device identification information and the user information obtained by the obtaining of user information, and
      (a-5) installing the second program on the host device; while
      (b) if it is determined by the determining that the second program is installed on the host device, activating the second program, and by means of the second program;
      (b-1) retrieving device identification information from the terminal unit,
      (b-2) retrieving user information stored in the second memory,
      (b-3) transferring, to the server via the network, the device identification information retrieved by the retrieving in (b-1) and the user information retrieved by the retrieving of the user information in (b-2), and
      (b-4) additionally storing, in the second memory, the device identification information retrieved by the retrieving in (b-1), by associating it with the user information.

21. The user information registration method as defined in claim 20, further comprising:
   by means of the first program,
   deleting at least the second program, between the first and second programs, from the first memory when the installing step is completed, and
   by means of the second program,
   deleting the first and second programs from the first memory.

22. The user information registration method as defined in claim 20, further comprising:
   by means of the first program,
   registering, in the terminal unit, the user information obtained by the obtaining of the user information, and
   by means of the second program,
   registering, in the terminal unit, the user information retrieved by the retrieving of the user information in (b-2).

23. The user information registration method as defined in claim 20, wherein, in the obtaining of the user information,
   a process of searching for the user information through the host device includes;
   a process of determining whether a plurality of application programs installed on the host device include an application program storing the user information in the host device, and
   a process of retrieving the user information stored by the application program from the host device if it is determined that there is an application program storing user information in the host device, while if it is determined that there is no application program storing the user information in the host device, displaying an input screen that promotes input of the user information and accepting input operation of the user information by the user.

24. The user information registration method as defined in claim 20, wherein, in the step of obtaining the user information,
- a process of searching for the user information through the host device includes;
- a process of transferring, to a predetermined server via a network, information that identifies application programs installed on the host device,
- a process of receiving response information transferred by the server in response to the transferred information that identifies application programs, and
- a process of retrieving the user information from a storage location identified by a storage location information of the user information if it is determined that the received response information includes storage location information of the user information for identifying the storage location of user information stored in the host device by any one of the application programs installed on the host device, while
- if it is determined that the received response information does not include the storage location information of the user information, displaying an input screen that promotes input of the user information and accepting input operation of the user information by the user.

25. The user information registration method as defined in claim 20, wherein the user information includes at least either of a user name or an e-mail address.

26. The user information registration method as defined in claim 20, wherein
- the terminal unit is a camera, and
- the first memory is a memory for storing image data captured by the camera.

* * * * *